United States Patent
Sun et al.

(10) Patent No.: US 11,528,093 B1
(45) Date of Patent: Dec. 13, 2022

(54) FORWARD-COMPATIBLE PUNCTURING INDICATIONS

(71) Applicant: QUALCOMM Incorporated, San Diego, CA (US)

(72) Inventors: Yanjun Sun, San Diego, CA (US); Bin Tian, San Diego, CA (US); Alfred Asterjadhi, San Diego, CA (US); George Cherian, San Diego, CA (US); Youhan Kim, Saratoga, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/328,464

(22) Filed: May 24, 2021

(51) Int. Cl.
*H04L 1/00* (2006.01)
*H04L 1/16* (2006.01)
*H04W 76/30* (2018.01)

(52) U.S. Cl.
CPC .......... *H04L 1/0069* (2013.01); *H04L 1/1614* (2013.01); *H04W 76/30* (2018.02)

(58) Field of Classification Search
None
See application file for complete search history.

(56) References Cited

U.S. PATENT DOCUMENTS

| 2017/0273083 A1* | 9/2017 | Chen ............. H04L 5/0062 |
| 2019/0141570 A1 | 5/2019 | Verma et al. |
| 2022/0045788 A1* | 2/2022 | Liu ............. H04L 5/0005 |

OTHER PUBLICATIONS

International Search Report and Written Opinion—PCT/US2022/030080—ISA/EPO—dated Sep. 9, 2022.
Sun (Qualcomm) Y., et al., "CR for 35.2.1.2 Preamble Puncturing", IEEE Draft, IEEE 802.11-21/0455r4, 11-21-0455-04-OOBE-CR-FOR-35-2-1-2-PREAMBLEPUNCTURING, IEEE-SA Mentor, Piscataway, NJ, USA, vol. 802.11 EHT, 802.11 be, No. 4, Apr. 27, 2021, pp. 1-11, XP068179929, [retrieved on Apr. 27, 2021] p. 7-p. 11.

* cited by examiner

*Primary Examiner* — Kouroush Mohebbi
(74) *Attorney, Agent, or Firm* — Holland & Hart LLP

(57) ABSTRACT

This disclosure provides systems, methods, and apparatuses for wireless communication that can be used for channel puncturing. A wireless station (STA) may receive an indication of a first puncturing pattern to be used for transmitting or receiving data over a wireless channel, where the first puncturing pattern is defined by a first wireless communication protocol release and the STA is configured to operate according to a second wireless communication protocol release. The STA may select, from a set of puncturing patterns defined by the second wireless communication protocol release, a second puncturing pattern that includes one or more non-punctured subchannels that are subsets of one or more corresponding non-punctured subchannels of the first puncturing pattern. The STA may use the second puncturing pattern to transmit or receive one or more packets over the wireless channel.

30 Claims, 26 Drawing Sheets

| Index | Bandwidth | Puncture size | Pattern | Field Value |
|---|---|---|---|---|
| 0 | 20/40 MHz | None | [1111] | 0 |
| 1 | 80 MHz | None | [1111] | 0 |
| 2 | 80 MHz | 20 MHZ | [x111] | 1 |
| 3 | 80 MHz | 20 MHZ | [1x11] | 2 |
| 4 | 80 MHz | 20 MHZ | [11x1] | 3 |
| 5 | 80 MHz | 20 MHZ | [111x] | 4 |

| Index | Puncture size | Pattern | Field Value |
|---|---|---|---|
| 0 | None | [11111111] | 0 |
| 1 | 20 MHz | [x1111111] | 1 |
| 2 | 20 MHz | [1x111111] | 2 |
| 3 | 20 MHz | [11x11111] | 3 |
| 4 | 20 MHz | [111x1111] | 4 |
| 5 | 20 MHz | [1111x111] | 5 |
| 6 | 20 MHz | [11111x11] | 6 |
| 7 | 20 MHz | [111111x1] | 7 |
| 8 | 20 MHz | [1111111x] | 8 |
| 9 | 40 MHz | [xx111111] | 9 |
| 10 | 40 MHz | [11xx1111] | 10 |
| 11 | 40 MHz | [1111xx11] | 11 |
| 12 | 40 MHz | [111111xx] | 12 |

820

| Index | Puncture size | Pattern | Field Value |
|---|---|---|---|
| 0 | None | [11111111] | 0 |
| 1 | 40 MHz | [x1111111] | 1 |
| 2 | 40 MHz | [1x111111] | 2 |
| 3 | 40 MHz | [11x11111] | 3 |
| 4 | 40 MHz | [111x1111] | 4 |
| 5 | 40 MHz | [1111x111] | 5 |
| 6 | 40 MHz | [11111x11] | 6 |
| 7 | 40 MHz | [111111x1] | 7 |
| 8 | 40 MHz | [1111111x] | 8 |
| 9 | 80 MHz | [xx111111] | 9 |
| 10 | 80 MHz | [11xx1111] | 10 |
| 11 | 80 MHz | [1111xx11] | 11 |
| 12 | 80 MHz | [111111xx] | 12 |
| 13 | 80+40 MHz | [xxx11111] | 13 |
| 14 | 80+40 MHz | [xx1x1111] | 14 |
| 15 | 80+40 MHz | [xx11x111] | 15 |
| 16 | 80+40 MHz | [xx111x11] | 16 |
| 17 | 80+40 MHz | [xx1111x1] | 17 |
| 18 | 80+40 MHz | [xx11111x] | 18 |
| 19 | 80+40 MHz | [x1111xx] | 19 |
| 20 | 80+40 MHz | [1x111xx] | 20 |
| 21 | 80+40 MHz | [11x11xx] | 21 |
| 22 | 80+40 MHz | [111x1xx] | 22 |
| 23 | 80+40 MHz | [1111x1xx] | 23 |
| 24 | 80+40 MHz | [11111xxx] | 24 |

| Index | Puncture size | Pattern |
|---|---|---|
| 0 | None | [1111111111111111] |
| 1 | 40 MHz | [xx11111111111111] |
| 2 | 40 MHz | [11xx111111111111] |
| 3 | 40 MHz | [1111xx1111111111] |
| 4 | 40 MHz | [111111xx11111111] |
| 5 | 40 MHz | [11111111xx111111] |
| 6 | 40 MHz | [1111111111xx1111] |
| 7 | 40 MHz | [111111111111xx11] |
| 8 | 40 MHz | [11111111111111xx] |
| 9 | 80 MHz | [xxxx111111111111] |
| 10 | 80 MHz | [1111xxxx11111111] |
| 11 | 80 MHz | [11111111xxxx1111] |
| 12 | 80 MHz | [111111111111xxxx] |
| 13 | 80+40 MHz | [xxxxxx1111111111] |
| 14 | 80+40 MHz | [xxxx11xx11111111] |
| 15 | 80+40 MHz | [xxxx1111xx111111] |
| 16 | 80+40 MHz | [xxxx111111xx1111] |
| 17 | 80+40 MHz | [xxxx11111111xx11] |
| 18 | 80+40 MHz | [xxxx1111111111xx] |
| 19 | 80+40 MHz | [xx1111111111xxxx] |
| 20 | 80+40 MHz | [11xx11111111xxxx] |
| 21 | 80+40 MHz | [1111xx1111xxxxxx] |
| 22 | 80+40 MHz | [111111xx1111xxxx] |
| 23 | 80+40 MHz | [11111111xx11xxxx] |
| 24 | 80+40 MHz | [1111111111xxxxxx] |

| Index | Puncture size | Pattern |
|---|---|---|
| 0 | None | [1111111111111111] |
| 1 | 40 MHz | [1x11111111111111] |
| 2 | 40 MHz | [11x1111111111111] |
| 3 | 40 MHz | [1111xx1111111111] |
| 4 | 40 MHz | [111111xx11111111] |
| 5 | 40 MHz | [11111111xx111111] |
| 6 | 40 MHz | [1111111111xx1111] |
| 7 | 40 MHz | [111111111111xx11] |
| 8 | 40 MHz | [11111111111111xx] |
| 9 | 80 MHz | [1xx1111111111111] |
| 10 | 80 MHz | [1111xxxx11111111] |
| 11 | 80 MHz | [11111111xxxx1111] |
| 12 | 80 MHz | [111111111111xxxx] |
| 13 | 80+40 MHz | [xxxxxx1111111111] |
| 14 | 80+40 MHz | [xxxx11xx11111111] |
| 15 | 80+40 MHz | [xxxx1111xx111111] |
| 16 | 80+40 MHz | [xxxx111111xx1111] |
| 17 | 80+40 MHz | [11xx11111111x111] |
| 18 | 80+40 MHz | [xx111111111111xx] |
| 19 | 80+40 MHz | [1x111111111xxxx] |
| 20 | 80+40 MHz | [11xx11111111x111] |
| 21 | 80+40 MHz | [1111xx111111x11] |
| 22 | 80+40 MHz | [111111xx11111x1] |
| 23 | 80+40 MHz | [11111111xx11111x] |
| 24 | 80+40 MHz | [1111111111xx1xx1] |

*Figure 13D*

FORWARD-COMPATIBLE PUNCTURING INDICATIONS

TECHNICAL FIELD

This disclosure relates generally to wireless communications, and more specifically, to wireless communications associated with channel puncturing.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Channel puncturing is a wireless communication technique which enables a wireless communication device (such as an AP or a STA) to transmit and receive wireless communications over a portion of a wireless channel exclusive of particular subchannels (referred to as "punctured subchannels"). For example, if a wireless communication device detects that a 20 MHz subchannel of a 160 MHz wireless channel is occupied, the wireless communication device can use channel puncturing to avoid communicating over the occupied subchannel while still utilizing the remaining 140 MHz bandwidth. Accordingly, channel puncturing allows a wireless communication device to improve or maximize its throughput by utilizing more of the available spectrum.

New WLAN communication protocols are being developed to enable enhanced communication features such as, for example, increases in the bandwidth of communications. New channel puncturing patterns may also be defined to increase the flexibility with which wireless communication devices can avoid transmitting or receiving data over occupied subchannels of a wireless channel while increasing or maximizing throughput over the non-occupied subchannels of the wireless channel.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless station (STA), and may include receiving an indication of a first puncturing pattern to be used for transmitting or receiving data over a wireless channel. The first puncturing pattern may be defined by a first wireless communication protocol release. The STA may be configured to operate according to a second wireless communication protocol release different than the first wireless communication protocol release. The method may include selecting a second puncturing pattern from a set of puncturing patterns defined by a second wireless communication protocol release, the second puncturing pattern including one or more non-punctured subchannels that are subsets of one or more corresponding non-punctured subchannels of the first puncturing pattern. The method may include transmitting or receiving one or more packets over the wireless channel based on the second puncturing pattern. In some instances, the STA may not be configured to operate according to the first wireless communication protocol release or may not be able to decode puncturing patterns defined by the first wireless communication protocol release.

In some implementations, selecting the second puncturing pattern may be based on a match between the received bitmap and one or more stored bitmaps corresponding to the set of puncturing patterns defined by the second wireless communication protocol release. The second puncturing pattern may include a non-punctured 20 MHz subchannel corresponding to a primary channel of an access point (AP). In some instances, the second puncturing pattern may include a frequency bandwidth of 320 MHz and zero or more punctured subchannels having a 40 MHz frequency bandwidth, an 80 MHz frequency bandwidth, or an 80+40 MHz frequency bandwidth. In other instances, the second puncturing pattern may include a frequency bandwidth of 160 MHz and zero or more punctured subchannels having a 40 MHz frequency bandwidth or a 20 MHz frequency bandwidth. In some other instances, the second puncturing pattern may include a frequency bandwidth of 80 MHz and zero or more punctured subchannels having a 20 MHz frequency bandwidth. In some other instances, the second puncturing pattern may include a frequency bandwidth of 40 MHz without puncturing or a frequency bandwidth of 20 MHz without puncturing.

In some implementations, the indication may be a bitmap including a plurality of bits, with each bit of the bitmap indicating whether a corresponding subchannel of the wireless channel is punctured by the first puncturing pattern. In some instances, the bitmap may be received in an extremely high-throughput (EHT) operation element of a beacon frame, an association response frame, a probe response frame, or an action frame.

In some implementations, selecting the second puncturing pattern also includes identifying each of the puncturing patterns of the set of puncturing patterns defined by the second wireless communication protocol release that includes non-punctured subchannels that are subsets of the one or more non-punctured subchannels of the first puncturing pattern, and selecting the identified puncturing pattern that includes the most non-punctured subchannels as the second puncturing pattern. In some instances, the method may also include determining, in response to two or more of the identified puncturing patterns including the most non-punctured subchannels, which of the two or more identified puncturing patterns includes a non-punctured subchannel associated with relatively high frequencies of the wireless channel or with relatively low frequencies of the wireless channel. The method may also include selecting the second puncturing pattern based on the determination. In some other instances, the method may also include determining, in response to two or more of the identified puncturing patterns including the most non-punctured subchannels, which of the two or more identified puncturing patterns is associated with a bitmap having the highest binary index or a bitmap having the lowest binary index. The method may also include selecting the second puncturing pattern based on the determination.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. In some implementations, the at least one memory may store processor-readable code that, when executed by the at least one processor in conjunction with the at least one modem, is configured to receive an indication of a first puncturing pattern to be used for transmitting or receiving data over a wireless channel, the first puncturing pattern being defined by a first wireless communication protocol release. The wireless communication device may be configured to operate according to a second wireless communication protocol release different than the first wireless communication protocol release. Execution of the processor-readable code may be configured to select a second puncturing pattern from a set of puncturing patterns defined by a second wireless communication protocol release, the second puncturing pattern including one or more non-punctured subchannels that are subsets of one or more corresponding non-punctured subchannels of the first puncturing pattern. Execution of the processor-readable code may be configured to transmit or receive one or more packets over the wireless channel based on the second puncturing pattern. In some instances, the wireless communication device may not be configured to operate according to the first wireless communication protocol release or may not be able to decode puncturing patterns defined by the first wireless communication protocol release.

In some implementations, selecting the second puncturing pattern may be based on a match between the received bitmap and one or more stored bitmaps corresponding to the set of puncturing patterns defined by the second wireless communication protocol release. The second puncturing pattern may include a non-punctured 20 MHz subchannel corresponding to a primary channel of an AP. In some instances, the second puncturing pattern may include a frequency bandwidth of 320 MHz and zero or more punctured subchannels having a 40 MHz frequency bandwidth, an 80 MHz frequency bandwidth, or an 80+40 MHz frequency bandwidth. In other instances, the second puncturing pattern may include a frequency bandwidth of 160 MHz and zero or more punctured subchannels having a 40 MHz frequency bandwidth or a 20 MHz frequency bandwidth. In some other instances, the second puncturing pattern may include a frequency bandwidth of 80 MHz and zero or more punctured subchannels having a 20 MHz frequency bandwidth. In some other instances, the second puncturing pattern may include a frequency bandwidth of 40 MHz without puncturing or a frequency bandwidth of 20 MHz without puncturing.

In some implementations, the indication may be a bitmap including a plurality of bits, each bit of the bitmap indicating whether a corresponding subchannel of the wireless channel is punctured by the first puncturing pattern. In some instances, the bitmap may be received in an EHT operation element of a beacon frame, an association response frame, a probe response frame, or an action frame.

In some implementations, selecting the second puncturing pattern also includes identifying each of the puncturing patterns of the set of puncturing patterns defined by the second wireless communication protocol release that includes non-punctured subchannels that are subsets of the one or more non-punctured subchannels of the first puncturing pattern, and selecting the identified puncturing pattern that includes the most non-punctured subchannels as the second puncturing pattern. In some instances, execution of the processor-readable code may be further configured to determine, in response to two or more of the identified puncturing patterns including the most non-punctured subchannels, which of the two or more identified puncturing patterns includes a non-punctured subchannel associated with relatively high frequencies of the wireless channel or with relatively low frequencies of the wireless channel. Execution of the processor-readable code may also be configured to select the second puncturing pattern based on the determination. In some other instances, execution of the processor-readable code may be further configured to determine, in response to two or more of the identified puncturing patterns including the most non-punctured subchannels, which of the two or more identified puncturing patterns is associated with a bitmap having the highest binary index or a bitmap having the lowest binary index. Execution of the processor-readable code may also be configured to select the second puncturing pattern based on the determination.

Another innovative aspect of the subject matter described in this disclosure can be implemented as a method of wireless communication. The method may be performed by an AP, and may include selecting a first puncturing pattern to be used for transmitting or receiving data over a wireless channel, the first puncturing pattern defined by a first wireless communication protocol release. The method may include determining a presence of one or more STAs configured to operate according to a second wireless communication protocol release. The method may include in response to determining the presence of the one or more STAs configured to operate according to the second wireless communication protocol release, selecting a second puncturing pattern from a set of puncturing patterns defined by the second wireless communication protocol release, the second puncturing pattern including one or more non-punctured subchannels that are subsets of one or more corresponding non-punctured subchannels of the first puncturing pattern. The method may include transmitting or receiving one or more packets over the wireless channel based on the second puncturing pattern to or from at least the STAs configured to operate according to the second wireless communication protocol release. In some instances, selecting the second puncturing pattern may be based on a match between a first bitmap corresponding to the first puncturing pattern and one or more second bitmaps corresponding to the set of puncturing patterns defined by the second wireless communication protocol release. In some instances, the STA may not be configured to operate according to the first wireless communication protocol release or may not be able to decode puncturing patterns defined by the first wireless communication protocol release.

In some implementations, the method may also include transmitting an indication of the second puncturing pattern to at least the STAs configured to operate according to the second wireless communication protocol release. In some instances, the indication may be a bit carried in an EHT operation element of a beacon frame, an association response frame, a probe response frame, or an action frame.

In some implementations, the second puncturing pattern may include a non-punctured 20 MHz subchannel corresponding to a primary channel of the AP. In some instances, the second puncturing pattern may include a frequency bandwidth of 320 MHz and zero or more punctured subchannels having a 40 MHz frequency bandwidth, an 80 MHz frequency bandwidth, or an 80+40 MHz frequency bandwidth. In other instances, the second puncturing pattern may include a frequency bandwidth of 160 MHz and zero or more punctured subchannels having a 40 MHz frequency bandwidth or a 20 MHz frequency bandwidth. In some other instances, the second puncturing pattern may include a frequency bandwidth of 80 MHz and zero or more punctured subchannels having a 20 MHz frequency bandwidth. In some other instances, the second puncturing pattern may include a frequency bandwidth of 40 MHz without puncturing or a frequency bandwidth of 20 MHz without puncturing.

In some implementations, selecting the second puncturing pattern also includes identifying each of the puncturing patterns of the set of puncturing patterns defined by the second wireless communication protocol release that includes non-punctured subchannels that are subsets of the one or more non-punctured subchannels of the first puncturing pattern, and selecting the identified puncturing pattern that includes the most non-punctured subchannels as the second puncturing pattern. In some instances, the method may also include determining, in response to two or more of the identified puncturing patterns including the most non-punctured subchannels, which of the two or more identified puncturing patterns includes a non-punctured subchannel associated with relatively high frequencies of the wireless channel or with relatively low frequencies of the wireless channel. The method may also include selecting the second puncturing pattern based on the determination. In some other instances, the method may also include determining, in response to two or more of the identified puncturing patterns including the most non-punctured subchannels, which of the two or more identified puncturing patterns is associated with a bitmap having the highest binary index or a bitmap having the lowest binary index. The method may also include selecting the second puncturing pattern based on the determination.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. In some implementations, the at least one memory may store processor-readable code that, when executed by the at least one processor in conjunction with the at least one modem, is configured to select a first puncturing pattern to be used for transmitting or receiving data over a wireless channel, the first puncturing pattern defined by a first wireless communication protocol release. Execution of the processor-readable code may be configured to determine a presence of one or more STAs configured to operate according to a second wireless communication protocol release. Execution of the processor-readable code may be configured to in response to determining the presence of the one or more STAs configured to operate according to the second wireless communication protocol release, select a second puncturing pattern from a set of puncturing patterns defined by the second wireless communication protocol release, the second puncturing pattern including one or more non-punctured subchannels that are subsets of one or more corresponding non-punctured subchannels of the first puncturing pattern. Execution of the processor-readable code may be configured to transmit or receive one or more packets over the wireless channel based on the second puncturing pattern to or from at least the STAs configured to operate according to the second wireless communication protocol release. In some instances, selecting the second puncturing pattern may be based on a match between a first bitmap corresponding to the first puncturing pattern and one or more second bitmaps corresponding to the set of puncturing patterns defined by the second wireless communication protocol release. In some instances, the STA may not be configured to operate according to the first wireless communication protocol release or may not be able to decode puncturing patterns defined by the first wireless communication protocol release.

In some implementations, execution of the processor-readable code may be further configured to transmit an indication of the second puncturing pattern to at least the STAs configured to operate according to the second wireless communication protocol release. In some instances, the indication may be a bit carried in an EHT operation element of a beacon frame, an association response frame, a probe response frame, or an action frame.

In some implementations, the second puncturing pattern may include a non-punctured 20 MHz subchannel corresponding to a primary channel of the wireless communication device. In some instances, the second puncturing pattern may include a frequency bandwidth of 320 MHz and zero or more punctured subchannels having a 40 MHz frequency bandwidth, an 80 MHz frequency bandwidth, or an 80+40 MHz frequency bandwidth. In other instances, the second puncturing pattern may include a frequency bandwidth of 160 MHz and zero or more punctured subchannels having a 40 MHz frequency bandwidth or a 20 MHz frequency bandwidth. In some other instances, the second puncturing pattern may include a frequency bandwidth of 80 MHz and zero or more punctured subchannels having a 20 MHz frequency bandwidth. In some other instances, the second puncturing pattern may include a frequency bandwidth of 40 MHz without puncturing or a frequency bandwidth of 20 MHz without puncturing.

In some implementations, selecting the second puncturing pattern also includes identifying each of the puncturing patterns of the set of puncturing patterns defined by the second wireless communication protocol release that includes non-punctured subchannels that are subsets of the one or more non-punctured subchannels of the first puncturing pattern, and selecting the identified puncturing pattern that includes the most non-punctured subchannels as the second puncturing pattern. In some instances, execution of the processor-readable code may be further configured to determine, in response to two or more of the identified puncturing patterns including the most non-punctured subchannels, which of the two or more identified puncturing patterns includes a non-punctured subchannel associated with relatively high frequencies of the wireless channel or with relatively low frequencies of the wireless channel. Execution of the processor-readable code may also be configured to select the second puncturing pattern based on the determination. In some other instances, execution of the processor-readable code may be further configured to determine, in response to two or more of the identified puncturing patterns including the most non-punctured subchannels, which of the two or more identified puncturing patterns is associated with a bitmap having the highest binary index or a bitmap having the lowest binary index. Execution of the processor-readable code may also be configured to select the second puncturing pattern based on the determination.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 8C shows example bitmaps indicating puncturing patterns useable for wireless communications over a 320 MHz bandwidth.

FIG. 13C shows example bitmap configurations indicating the puncturing patterns of FIGS. 11A, 12A, and 13A according to some implementations.

FIG. 13D shows example bitmaps indicating the puncturing patterns of FIGS. 11B, 12B, and 13B according to some implementations.

Like reference numbers and designations in the various drawings indicate like elements.

DETAILED DESCRIPTION

Figure 1:
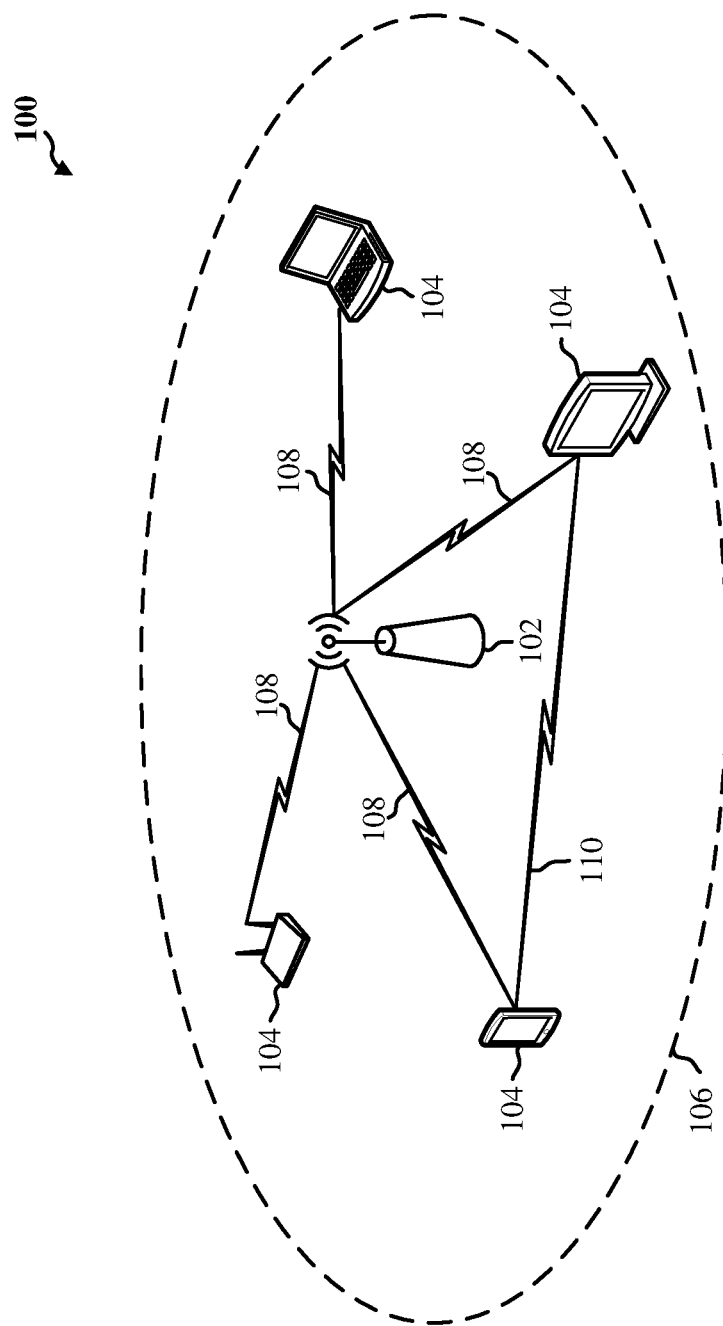
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to channel puncturing in wireless communications. Some implementations more specifically relate to punctured channel indications that support channel puncturing based on different sets of puncturing patterns defined by different wireless communication protocol releases. Channel puncturing is a wireless communication technique that allows a wireless communication device (such as an AP or a STA) to transmit or receive wireless communications over some subchannels (referred to as "non-punctured subchannels") of a wireless channel while avoiding other subchannels (referred to as "punctured subchannels") of the wireless channel. For example, if a wireless communication device determines that a 20 MHz subchannel of a 160 MHz wireless channel is occupied, the wireless communication device can use channel puncturing to avoid transmitting or receiving data over the occupied 20 MHz subchannel while still utilizing the other non-occupied 140 MHz bandwidth of the wireless channel. Accordingly, channel puncturing allows a wireless communication device to improve or maximize throughput by utilizing more of the available channel bandwidth.

As the bandwidth of a wireless channel increases, the likelihood of interference on one or more subchannels of the wireless channel also increases. Thus, as new WLAN communication protocols enable access to a greater range of bandwidths, new or additional channel puncturing patterns may be needed to efficiently utilize the wider channel bandwidths available. The wider channel bandwidths may also be efficiently utilized by defining new puncturing patterns that have smaller puncturing granularities than existing puncturing patterns. For example, while existing puncturing patterns may indicate whether certain 40 MHz or 80 MHz subchannels of a 320 MHz frequency bandwidth are to be punctured, new puncturing patterns may be defined that also indicate whether certain 20 MHz subchannels of the 320 MHz frequency bandwidth are to be punctured.

These new or additional puncturing patterns may increase the both the number and size of bitmaps used to indicate which puncturing pattern of a set of puncturing patterns is to be used for transmitting or receiving data over a wireless channel. A wireless communication device configured to operate according to one wireless communication protocol release that defines a relatively small set of puncturing patterns may not be able to decode bitmaps associated with another wireless communication protocol release that defines a relatively large set of puncturing patterns. Moreover, the wireless communication device may not be aware of the new or additional puncturing patterns defined by the other wireless communication protocol release.

Aspects of the present disclosure recognize that to ensure compatibility between wireless communication devices configured to operate according to different wireless communication protocol releases that define different numbers or configurations of puncturing patterns, a wireless communication device operating according to one wireless communication protocol release should be able to determine or derive puncturing patterns defined by another wireless communication protocol release. In some implementations, a wireless communication device such as a STA may receive an indication of a first puncturing pattern to be used for transmitting or receiving data over a wireless channel, where the first puncturing pattern is defined by a first wireless communication protocol release and the STA is configured to operate according to a second wireless communication protocol release and may not be able to decode puncturing patterns defined by the first wireless communication protocol release (such as because the STA is not configured to operate according to the first wireless communication protocol release). The STA may select, from a set of puncturing patterns defined by the second wireless communication protocol release, a second puncturing pattern that includes one or more non-punctured subchannels that are subsets of one or more corresponding non-punctured subchannels of the first puncturing pattern. The STA may use the second puncturing pattern to transmit or receive one or more packets over the wireless channel.

In some other implementations, a wireless communication device such as an AP may select a first puncturing pattern defined by a first wireless communication protocol release to be used for transmitting or receiving data over a wireless channel. The AP may determine a presence of one or more STAs configured to operate according to a second wireless communication protocol release. In response to the presence of the one or more STAs configured to operate according to the second wireless communication protocol release, the AP may select, from a set of puncturing patterns defined by the second wireless communication protocol release, a second puncturing pattern that includes one or more non-punctured subchannels that are subsets of one or more corresponding non-punctured subchannels of the first puncturing pattern. The AP may transmit or receive one or more packets over the wireless channel based on the second puncturing pattern to or from at least the STAs configured to operate according to the second wireless communication protocol release and not the first wireless communication protocol release.

Particular implementations of the subject matter described in this disclosure can be implemented to realize one or more of the following potential advantages. By providing a mechanism through which a wireless communication device configured to operate according to one wireless communication protocol release can determine or derive a puncturing pattern to use for transmitting or receiving data over a wireless channel based on an indication of a puncturing pattern defined by another wireless communication protocol release, aspects of the present disclosure may ensure compatibility between wireless communication devices configured to operate according to different wireless communication protocol releases that define different numbers or configurations of puncturing patterns.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf, in addition to further amendments). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described herein). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figures 2A, 2B:
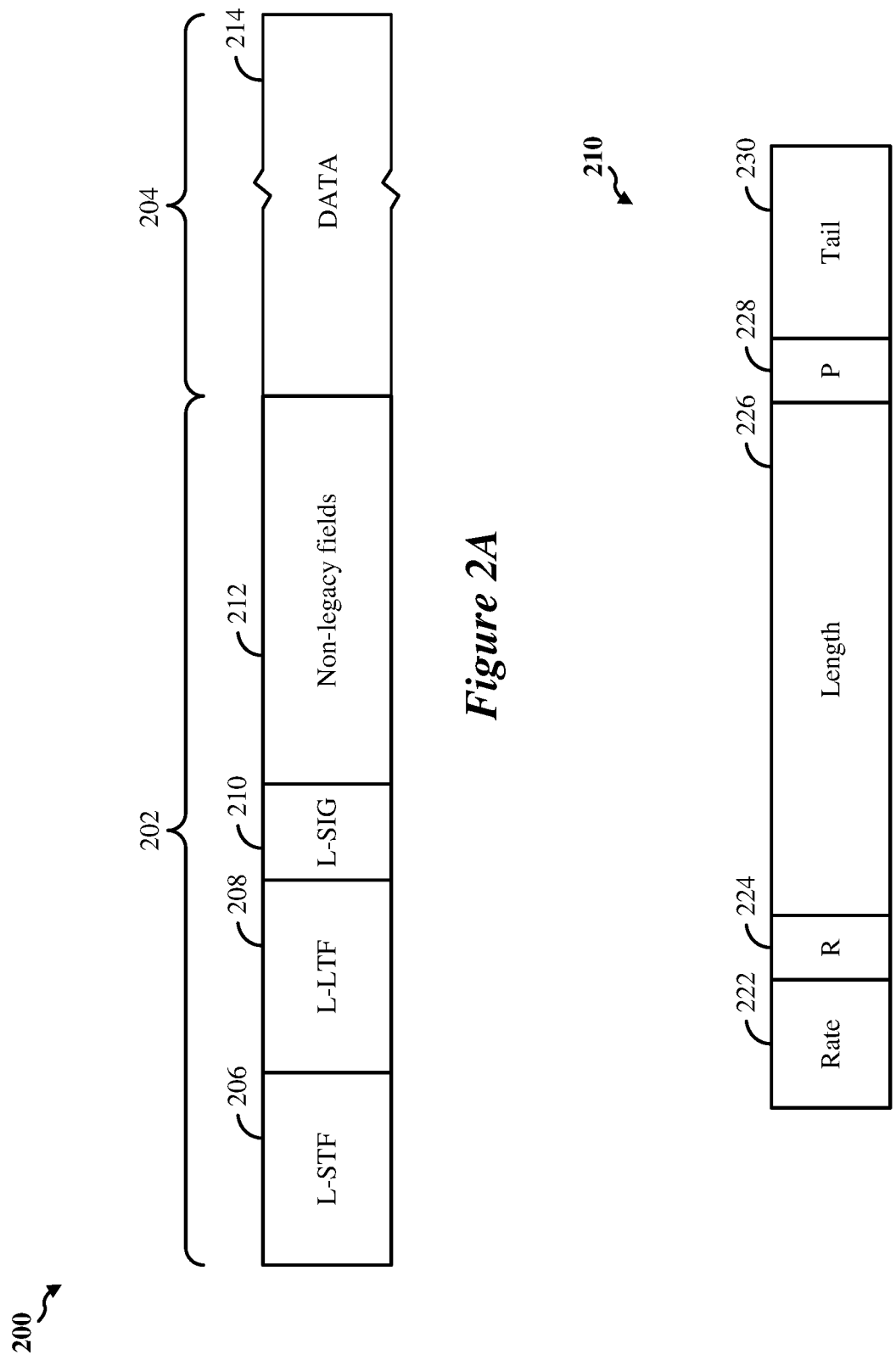
FIG. 2A shows an example protocol data unit (PDU) usable for communications between an access point (AP) and one or more stations (STAs).
FIG. 2B shows an example field in the PDU of FIG. 2A.

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 also may include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
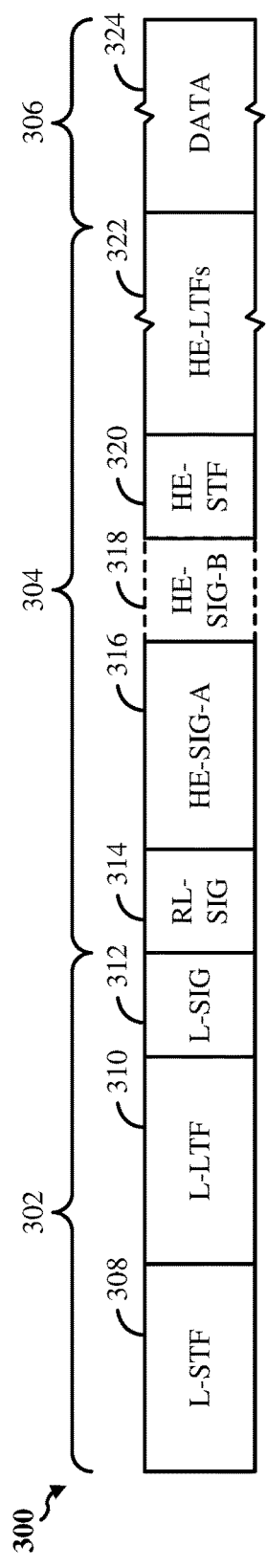
FIG. 3A shows an example PDU usable for communications between an AP and each of a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
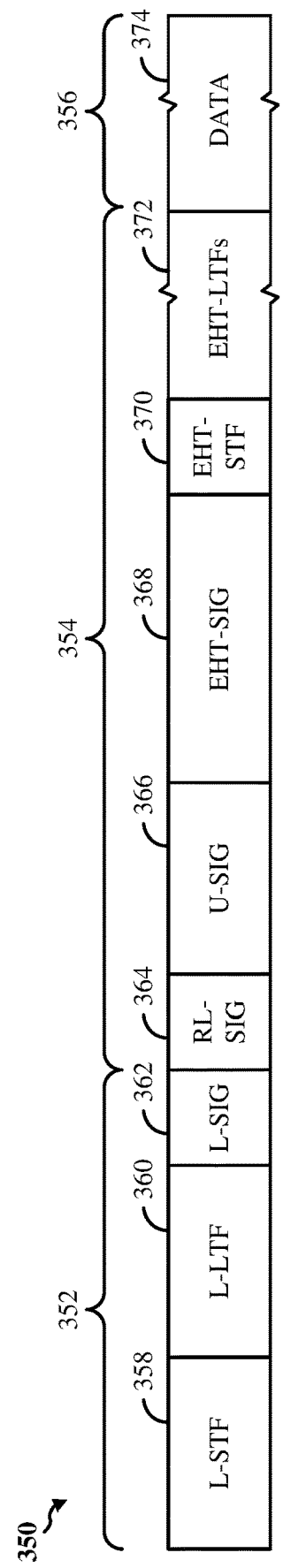
FIG. 3B shows another example PDU usable for communications between an AP and each of a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
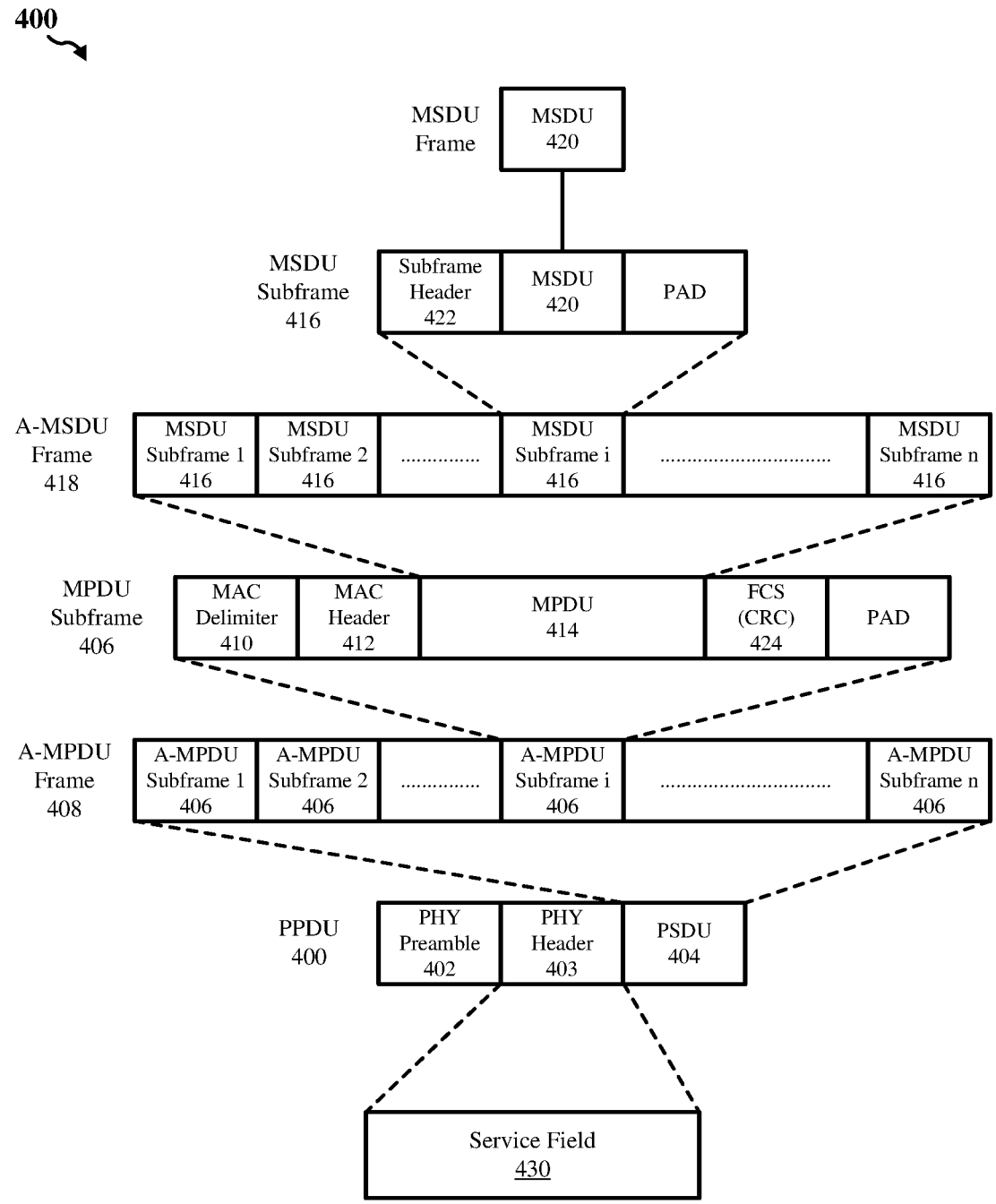
FIG. 4 shows an example physical layer convergence protocol (PLCP) protocol data unit (PPDU) usable for communications between an AP and each of a number of STAs.

FIG. 4 shows an example PPDU 400 usable for communications between an AP 102 and a number of STAs 104. As described herein, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 424 may include a cyclic redundancy check (CRC).

As described herein, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104)

one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described herein). The $N_{SS}$ spatial streams may be mapped to a number $N_{STS}$ of space-time streams, which are mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas also may support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may generate a precoding (or "steering") matrix for the beamformee based on the feedback and use the steering matrix to precode the data streams to configure the amplitudes and phase shifts for subsequent transmissions to the beamformee.

As described herein, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5:
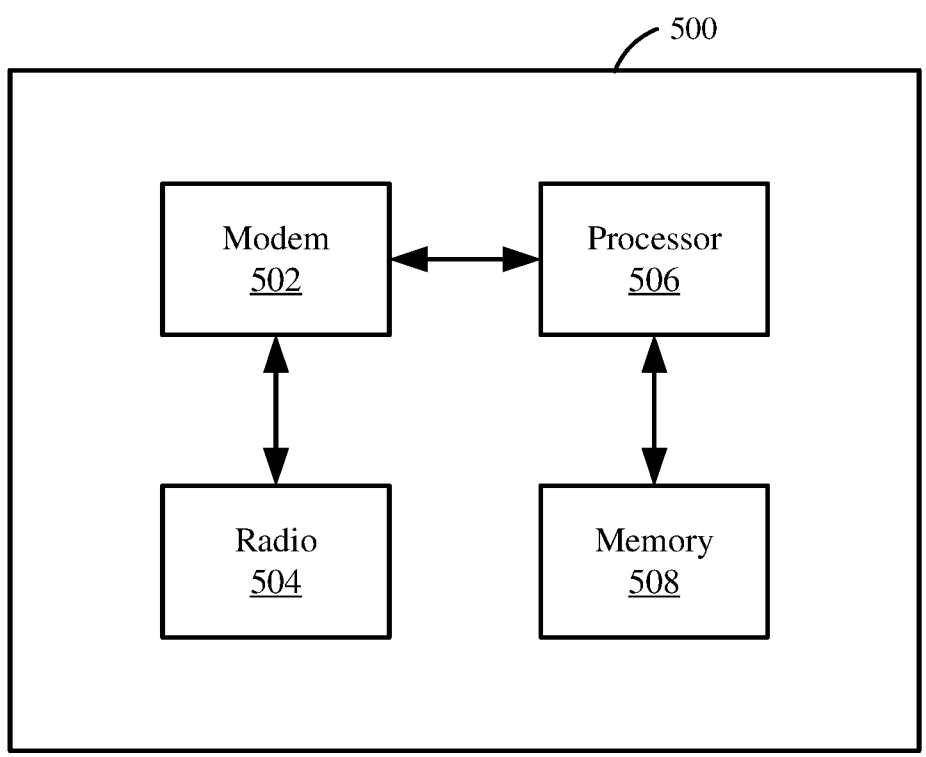
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
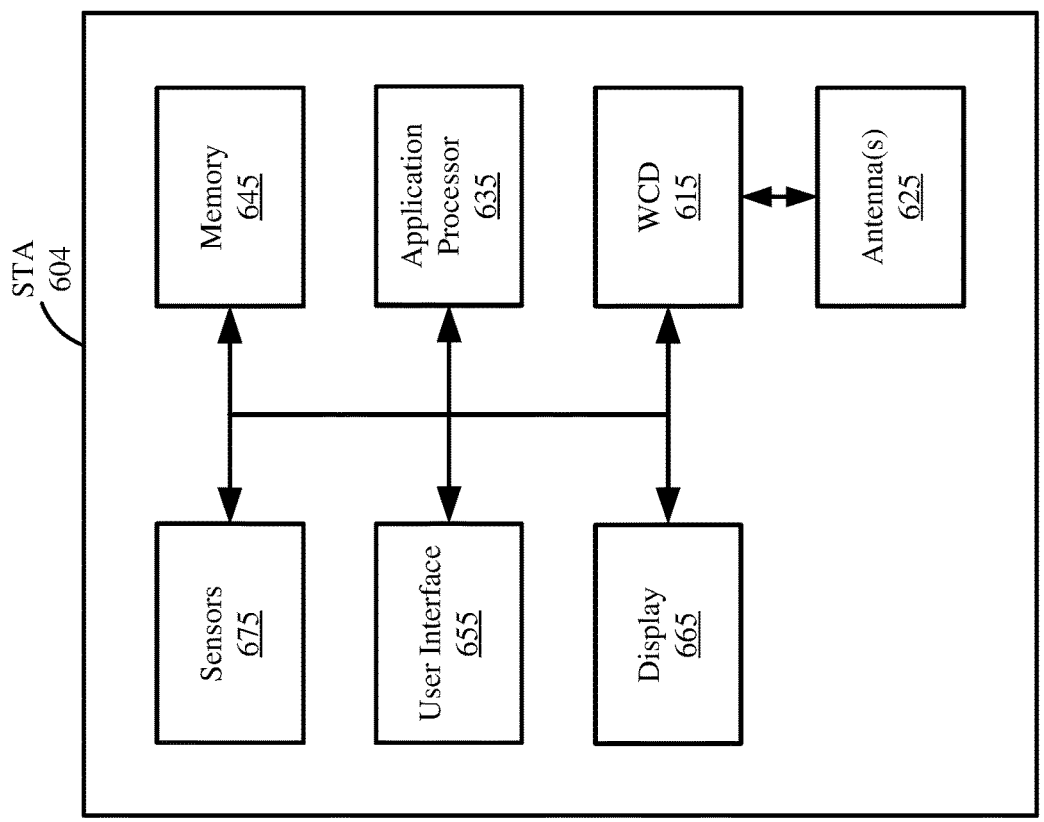
FIG. 6B shows a block diagram of an example STA.
Figure 6A:
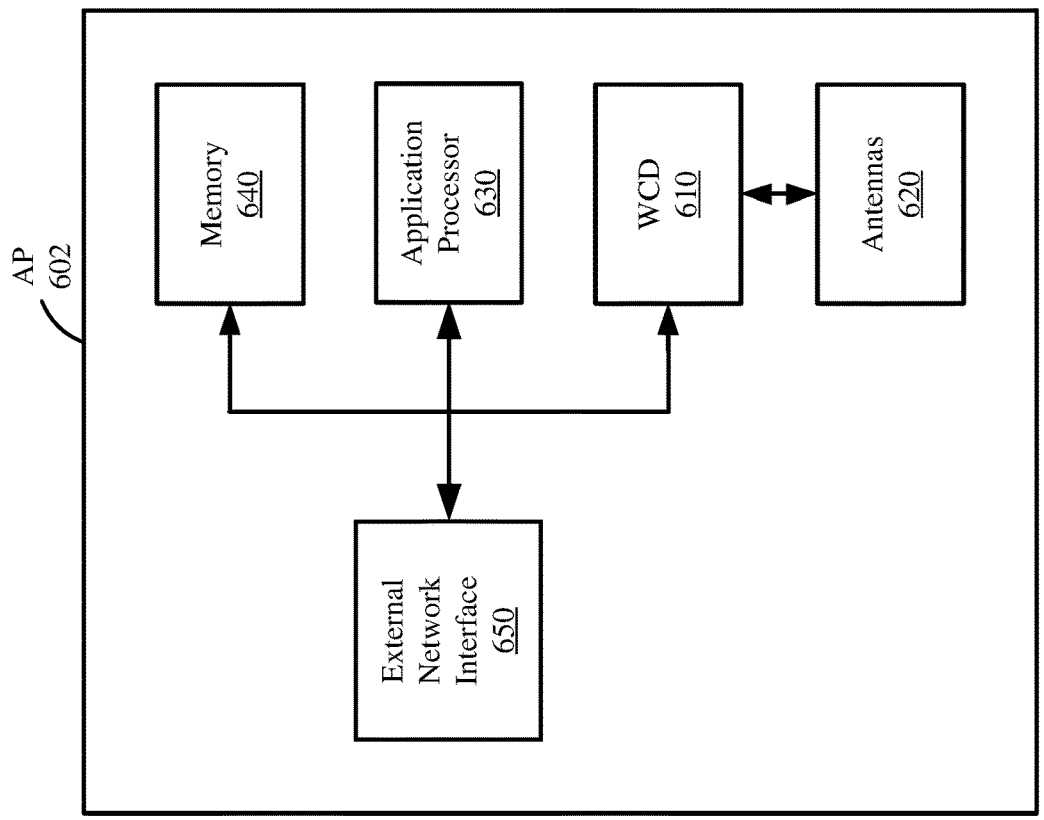
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
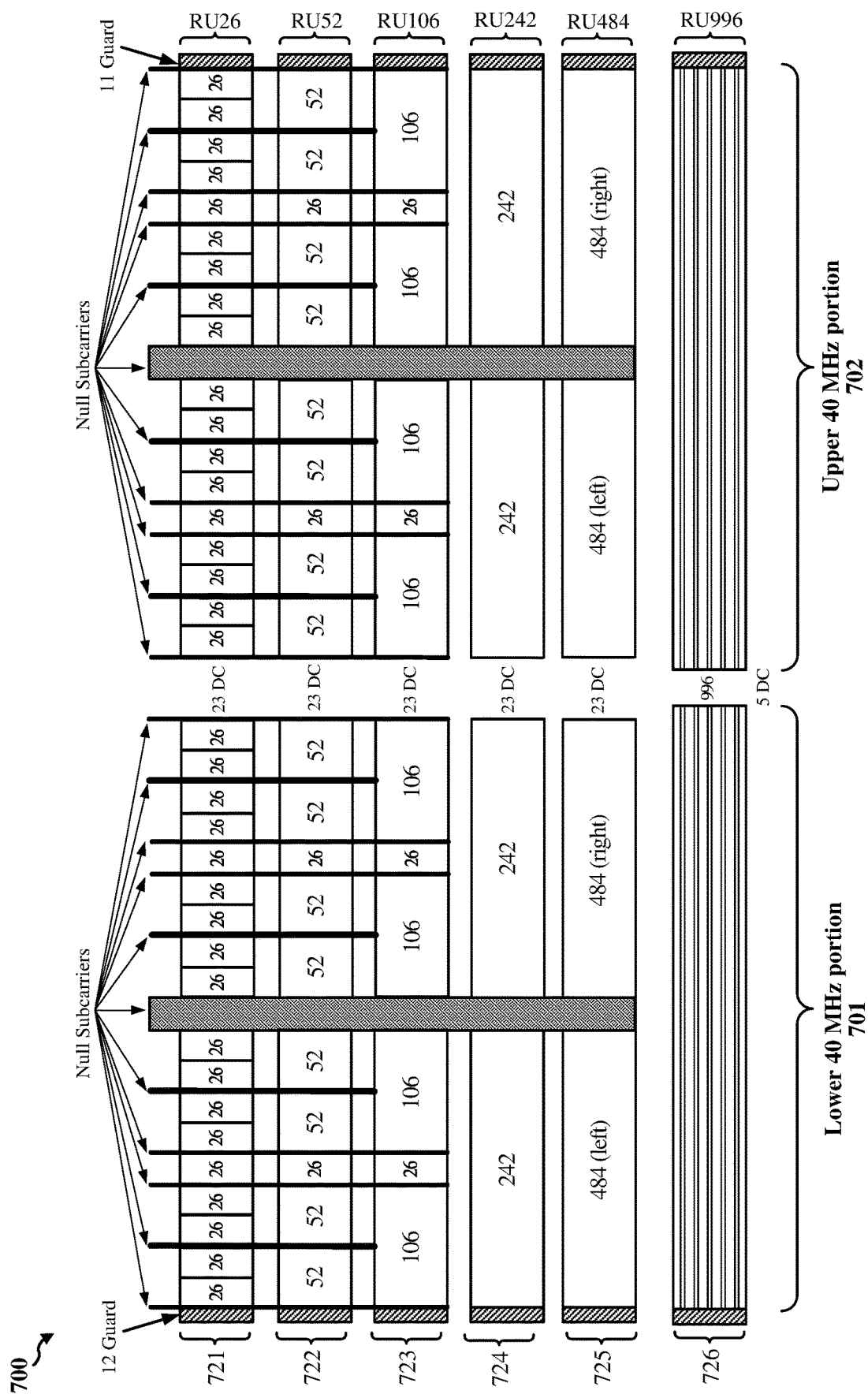
FIG. 7 shows example tone plans useable for orthogonal frequency division multiple access (OFDMA) transmissions over an 80 MHz bandwidth.

FIG. 7 shows an example tone map 700 usable for OFDMA transmissions over an 80 MHz bandwidth. In some instances, the tone map 700 may be defined by the IEEE 802.11ax amendments to the IEEE 802.11 wireless communication standard. The 80 MHz bandwidth may be divided into different numbers of RUs based on the size of the RUs. As shown, the tone map 700 includes six tone plans: a first tone plan 721 includes thirty-six RUs that each span 26 tones ("RU26s"), a second tone plan 722 includes eighteen RUs that each span 52 tones ("RU52s"), a third tone plan 723 includes nine RUs that each span 106 tones ("RU106s"), a fourth tone plan 724 includes four RUs that each span 242 tones ("RU242s"), a fifth tone plan 725 includes two RUs that span 484 tones ("RU484s"), and a sixth tone plan 726 includes one RU that spans 996 tones ("RU996"). Each RU26 includes 24 data subcarriers and 2 pilot subcarriers, each RU52 includes 48 data subcarriers and 4 pilot subcarriers, each RU106 includes 102 data subcarriers and 4 pilot subcarriers, each RU242 includes 234 data subcarriers and 8 pilot subcarriers, each RU484 includes 468 data subcarriers and 16 pilot subcarriers, and the RU996 includes 980 data subcarriers and 16 pilot subcarriers.

Each of the tone plans 721-726 may be divided into a lower 40 MHz portion 701 and an upper 40 MHz portion 702. The lower 40 MHz portion 701 and the upper 40 MHz portion 702 of each of the tone plans 721-725 may be separated by 23 DC tones, and the lower 40 MHz portion 701 and the upper 40 MHz portion 702 of the tone plan 726 may be separated by 5 DC tones. Additionally, the lower 40 MHz portion 701 of each of the tone plans 721-725 may be divided into first and second 20 MHz portions separated by 5 null subcarriers, and the upper 40 MHz portion 702 of each of the tone plans 721-725 may be divided into third and fourth 20 MHz portions separated by 5 null subcarriers.

As described above, channel puncturing allows wireless communication devices to transmit or receive wireless communications over some portions of a wireless channel while excluding other portions of the wireless channel from the transmission or reception of the wireless communications. A wireless communication device (such as an AP or a STA) may puncture one or more subchannels of a wireless channel to avoid interfering with incumbent systems that occupy the one or more subchannels. For example, if an AP determines that a 20 MHz subchannel of a 160 MHz wireless channel is occupied by an incumbent system, the AP may puncture the 20 MHz subchannel to avoid interference associated with the incumbent system while still utilizing the other non-punctured 140 MHz bandwidth of the wireless channel. A puncturing pattern may be used to specify or indicate the punctured 20 MHz subchannel and the non-punctured 140 MHz subchannels of the 160 MHz wireless channel. In some implementations, the puncturing pattern may be represented using a bitmap including a plurality of bits, where each bit of the bitmap indicates whether a corresponding subchannel of a plurality of subchannels of the wireless channel is punctured (or not punctured). Although such bitmaps are described herein as indicating which subchannels of a wireless channel are punctured, in some other implementations, the bitmaps described herein may indicate whether corresponding RUs or groups of RUs of a frequency bandwidth are punctured (or not punctured).

One wireless communication protocol release defines a set of forty-four puncturing patterns usable for puncturing an 80 MHz bandwidth, a 160 MHz bandwidth, a 320 MHz bandwidth of a wireless channel, and a contiguous bandwidth of 20 MHz, 40 MHz, 80 MHz, 160 MHz or 320 MHz of a wireless channel. The set of puncturing patterns may include four puncturing patterns indicating different 20 MHz punctured subchannels of an 80 MHz bandwidth, may include eight puncturing patterns indicating different 20 MHz punctured subchannels of a 160 MHz bandwidth, may include four puncturing patterns indicating different 40 MHz punctured subchannels of the 160 MHz bandwidth, may include eight puncturing patterns indicating different 40 MHz punctured subchannels of a 320 MHz bandwidth, may include four puncturing patterns indicating different 80 MHz punctured subchannels of the 320 MHz bandwidth, and may include twelve puncturing patterns indicating different 80+40 MHz punctured subchannels of the 320 MHz bandwidth. In some instances, the wireless communication protocol release may be a first release (Release 1) of the IEEE 802.11be amendment (or earlier amendments) to the IEEE 802.11 wireless communication standard.

Figure 8A:
FIG. 8A shows example bitmaps indicating puncturing patterns useable for wireless communications over a 20 MHz bandwidth, a 40 MHz bandwidth, and an 80 MHz bandwidth.

In some implementations, a 4-bit or 8-bit bitmap may be used to indicate which (if any) of the puncturing patterns defined by the wireless communication protocol release are to be used for channel puncturing. For example, FIG. 8A depicts different configurations of a 4-bit bitmap 800 that can be used to indicate various puncturing patterns for a 20 MHz bandwidth, a 40 MHz bandwidth, and an 80 MHz bandwidth. As used herein, a bit value of "x" indicates that a corresponding subchannel is punctured, and a bit value of "1" indicates that the corresponding subchannel is not punctured. For example, the bitmap 800 having index 0 shown as [1111] indicates contiguous 20 MHz or 40 MHz bandwidth. The bitmap 800 having index 1 shown as [1111] indicates that none of the 80 MHz frequency bandwidth is punctured. The bitmap 800 having index 2 shown as [x111] indicates that the $1^{st}$ 20 MHz subchannel of the 80 MHz bandwidth is punctured, the bitmap 800 having index 3 shown as [1x11] indicates that the $2^{nd}$ 20 MHz subchannel of the 80 MHz bandwidth is punctured, the bitmap 800 having index 4 shown as [11x1] indicates that the $3^{rd}$ 20 MHz subchannel of the 80 MHz bandwidth is punctured, and the bitmap 800 having index 5 shown as [111x] indicates that the $4^{th}$ 20 MHz subchannel of the 80 MHz bandwidth is punctured.

Figure 8B:
FIG. 8B shows example bitmaps indicating puncturing patterns useable for wireless communications over a 160 MHz bandwidth.

FIG. 8B depicts different configurations of an 8-bit bitmap 810 that can be used to indicate various puncturing patterns for a 160 MHz bandwidth. The bitmap 810 having index 0 shown as [11111111] indicates that none of the subchannels of the 160 MHz bandwidth are punctured. The bitmap 810 can have eight additional index values 1-8 indicating corresponding puncturing patterns that puncture different 20 MHz subchannels of the 160 MHz bandwidth. For example, the bitmap 810 having index 1 shown as [x1111111] indicates that the $1^{st}$ 20 MHz subchannel of the 160 MHz bandwidth is punctured, the bitmap 810 having index 2 shown as [1x111111] indicates that the $2^{nd}$ 20 MHz subchannel of the 160 MHz bandwidth is punctured, the bitmap 810 having index 3 shown as [11x11111] indicates that the $3^{rd}$ 20 MHz subchannel of the 160 MHz bandwidth is punctured, and so on.

The bitmap 810 can have four additional index values 9-12 indicating corresponding puncturing patterns that puncture different 40 MHz subchannels of the 160 MHz bandwidth, where the presence of adjacent "x" bits in a respective configuration of the bitmap 810 indicates that adjacent 20 MHz subchannels of the 160 MHz bandwidth are punctured (thereby resulting in a contiguous 40 MHz punctured subchannel). For example, the bitmap 810 having index 9 shown as [xx111111] indicates that the $1^{st}$ and $2^{nd}$ 20 MHz subchannels of the 160 MHz bandwidth are punctured, the bitmap 810 having index 10 shown as [11xx1111] indicates that the $3^{rd}$ and $4^{th}$ 20 MHz subchannels of the 160 MHz bandwidth are punctured, and so on.

FIG. 8C depicts different configurations of an 8-bit bitmap 820 that can be used to indicate various puncturing patterns for a 320 MHz bandwidth. The bitmap 820 having index 0 shown as [11111111] indicates that none of the subchannels of the 320 MHz bandwidth are punctured. The bitmap 820 can have eight additional index values 1-8 indicating corresponding puncturing patterns that puncture different 40 MHz subchannels of the 320 MHz bandwidth. For example, the bitmap 820 having index 1 shown as [x1111111] indicates that the $1^{st}$ 40 MHz subchannel of the 320 MHz bandwidth is punctured, the bitmap 820 having index 2 shown as [1x111111] indicates that the $2^{nd}$ 40 MHz subchannel of the 320 MHz bandwidth is punctured, the bitmap 820 having index 3 shown as [11x11111] indicates that the $3^{rd}$ 40 MHz subchannel of the 320 MHz bandwidth is punctured, and so on.

The bitmap 820 can have four additional index values 9-12 indicating corresponding puncturing patterns that puncture different 80 MHz subchannels of the 320 MHz bandwidth. For example, the bitmap 820 having index 9 shown as [xx111111] indicates that the $1^{st}$ and $2^{nd}$ 40 MHz subchannels of the 320 MHz bandwidth are punctured (thereby resulting in a contiguous 80 MHz punctured subchannel), the bitmap 820 having index 10 shown as [11xx1111] indicates that the $3^{rd}$ and $4^{th}$ 40 MHz subchannels of the 320 MHz bandwidth are punctured (thereby resulting in a contiguous 80 MHz punctured subchannel), and so on.

The bitmap 820 can have twelve additional index values 13-24 indicating corresponding puncturing patterns that puncture different 80+40 MHz subchannels of the 320 MHz bandwidth, where the presence of non-adjacent "x" bits in a respective configuration of the bitmap 820 indicates that non-contiguous 40 MHz subchannels of the 320 MHz bandwidth are punctured. For example, the bitmap 820 having index 13 shown as [xxx11111] indicates that the $1^{st}$, $2^{nd}$, and $3^{rd}$ 40 MHz subchannels of the 320 MHz bandwidth are punctured (thereby resulting in a contiguous 120 MHz punctured subchannel), the bitmap 820 having index 14 shown as [xx1x1111] indicates that the $1^{st}$, $2^{nd}$, and $4^{th}$ 40 MHz subchannels of the 320 MHz bandwidth are punctured, the bitmap having index 19 shown as [x11111xx] indicates that the $1^{st}$, $7^{th}$, and $8^{th}$ 40 MHz subchannels of the 320 MHz bandwidth are punctured, the bitmap having index 20 shown as [1x1111xx] indicates that the $2^{nd}$, $7^{th}$, and $8^{th}$ 40 MHz subchannels of the 320 MHz bandwidth are punctured, and so on.

As discussed, as new WLAN communication protocols enable access to a greater range of bandwidths, new or additional channel puncturing patterns may be needed to efficiently utilize the wider channel bandwidths. The wider channel bandwidths may also be efficiently utilized by defining new puncturing patterns that have smaller puncturing granularities than existing puncturing patterns. For example, while existing puncturing patterns may indicate whether certain 40 MHz or 80 MHz subchannels of a 320 MHz frequency bandwidth are to be punctured, new puncturing patterns may be defined that also indicate whether certain 20 MHz subchannels of the 320 MHz frequency bandwidth are to be punctured.

These new or additional puncturing patterns may increase the number of different puncturing patterns available to wireless communication devices, which in turn may increase both the number and the size of the bitmaps used to indicate which puncturing pattern of a set of puncturing patterns is to be used for channel puncturing. A wireless communication device configured to operate according to one wireless communication protocol release that defines a relatively small set of puncturing patterns may not be able to decode the larger bitmaps associated with another wireless communication protocol release that defines a relatively large set of puncturing patterns. Moreover, the wireless communication device may not be aware of the new or additional puncturing patterns defined by the other wireless communication protocol release.

To ensure compatibility between wireless communication devices configured to operate according to different wireless communication protocol releases that define different numbers or configurations of puncturing patterns, aspects of the present disclosure provide a mechanism through which a wireless communication device operating according to one wireless communication protocol release can determine or derive puncturing patterns defined by another wireless communication protocol release.

Figure 9:
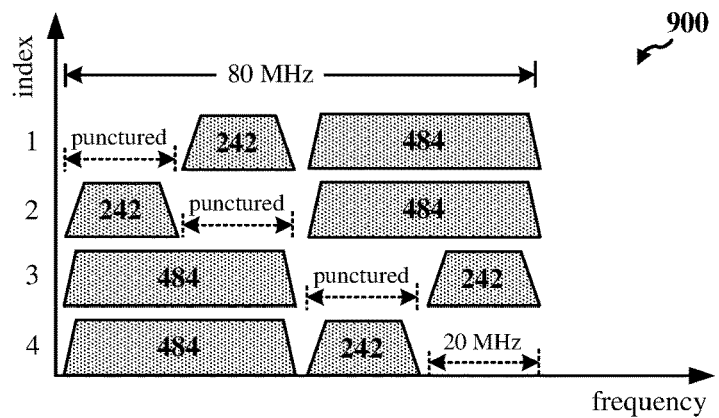
FIG. 9 shows an example set of puncturing patterns useable for wireless communications over an 80 MHz frequency bandwidth according to one wireless communication protocol release.

FIG. 9 shows an example set of puncturing patterns 900 useable for wireless transmissions over an 80 MHz frequency bandwidth according to one wireless communication protocol release. In some instances, the set of puncturing patterns 900 may be defined by Release 1 of the IEEE 802.11be amendment. The set of puncturing patterns 900 includes 4 puncturing patterns having bitmap indices 1-4 corresponding to bitmaps 1-4, respectively, of FIG. 8A. Each of the 4 puncturing patterns indicates a different 20 MHz subchannel of the 80 MHz frequency bandwidth that is to be punctured. For example, the $1^{st}$ puncturing pattern having bitmap index 1 indicates that the $1^{st}$ 20 MHz subchannel is to be punctured, the $2^{nd}$ puncturing pattern having bitmap index 2 indicates that the $2^{nd}$ 20 MHz subchannel is to be punctured, the $3^{rd}$ puncturing pattern having bitmap index 3 indicates that the $3^{rd}$ 20 MHz subchannel is to be punctured, and the $4^{th}$ puncturing pattern having bitmap index 4 indicates that the $4^{th}$ 20 MHz subchannel is to be punctured.

Figure 10A:
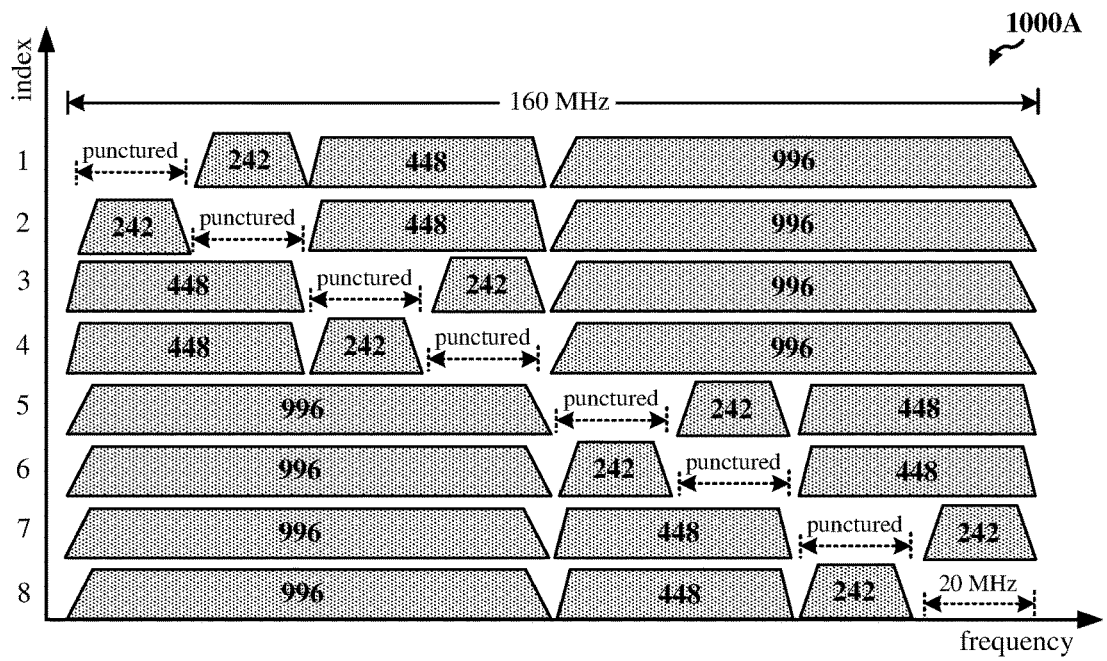
FIG. 10A shows an example set of puncturing patterns useable for wireless communications over a 160 MHz bandwidth according to one wireless communication protocol release.

FIG. 10A shows an example set of puncturing patterns 1000A useable for wireless transmissions over a 160 MHz bandwidth according to one wireless communication protocol release. In some instances, the set of puncturing patterns 1000A may be defined by Release 1 of the IEEE 802.11be amendment. The set of puncturing patterns 1000A includes 8 puncturing patterns having bitmap indices 1-8 corresponding to bitmaps 1-8, respectively, of FIG. 8B. Each of the 8 puncturing patterns indicates a different 20 MHz subchannel of the 160 MHz frequency bandwidth that is to be punctured. For example, the $1^{st}$ puncturing pattern having bitmap index 1 indicates that the $1^{st}$ 20 MHz subchannel is to be punctured, the $2^{nd}$ puncturing pattern having bitmap index 2 indicates that the $2^{nd}$ 20 MHz subchannel is to be punctured, the 3$^{rd}$ puncturing pattern having bitmap index 3 indicates that the 3$^{rd}$ 20 MHz subchannel is to be punctured, and so on, where the 8$^{th}$ puncturing pattern having bitmap index 8 indicates that the 8$^{th}$ 20 MHz subchannel is to be punctured.

Figure 10B:
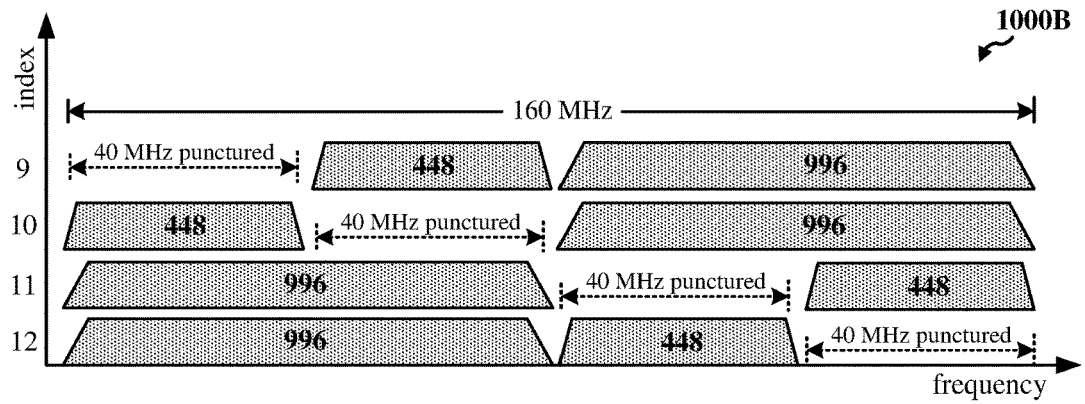
FIG. 10B shows another example set of puncturing patterns useable for wireless communications over a 160 MHz bandwidth according to one wireless communication protocol release.

FIG. 10B shows an example set of puncturing patterns 1000B useable for wireless transmissions over a 160 MHz bandwidth according to one wireless communication protocol release. In some instances, the set of puncturing patterns 1000B may be defined by Release 1 of the IEEE 802.11be amendment. The set of puncturing patterns 1000B includes 4 puncturing patterns having bitmap indices 9-12 corresponding to bitmaps 9-12, respectively, of FIG. 8B. Each of the 4 puncturing patterns indicates a different 40 MHz subchannel of the 160 MHz frequency bandwidth that is to be punctured. For example, the 1$^{st}$ puncturing pattern having bitmap index 9 indicates that the 1$^{st}$ 40 MHz subchannel is to be punctured, the 2$^{nd}$ puncturing pattern having bitmap index 10 indicates that the 2$^{nd}$ 40 MHz subchannel is to be punctured, the 3$^{rd}$ puncturing pattern having bitmap index 11 indicates that the 3$^{rd}$ 40 MHz subchannel is to be punctured, and the 4$^{th}$ puncturing pattern having bitmap index 12 indicates that the 4$^{th}$ 40 MHz subchannel is to be punctured.

Figure 11A:
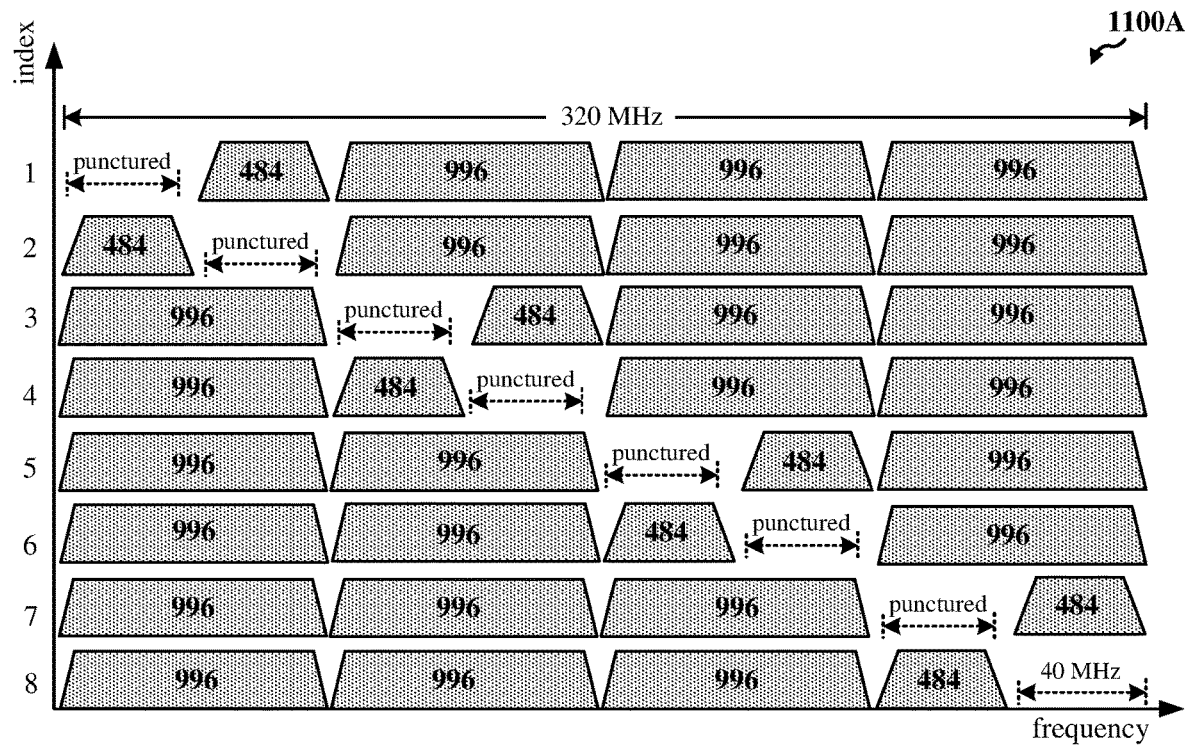
FIG. 11A shows an example set of puncturing patterns useable for wireless communications over a 320 MHz bandwidth according to one wireless communication protocol release.

FIG. 11A shows an example set of puncturing patterns 1100A useable for wireless transmissions over a 320 MHz bandwidth according to one wireless communication protocol release. In some instances, the set of puncturing patterns 1100A may be defined by Release 1 of the IEEE 802.11be amendment. The set of puncturing patterns 1100A includes 8 puncturing patterns having bitmap indices 1-8 corresponding to bitmaps 1-8, respectively, of FIG. 8C. Each of the 8 puncturing patterns indicates a different 40 MHz subchannel of the 320 MHz frequency bandwidth that is to be punctured. For example, the 1$^{st}$ puncturing pattern having bitmap index 1 indicates that the 1$^{st}$ 40 MHz subchannel is to be punctured, the 2$^{nd}$ puncturing pattern having bitmap index 2 indicates that the 2$^{nd}$ 40 MHz subchannel is to be punctured, the 3$^{rd}$ puncturing pattern having bitmap index 3 indicates that the 3$^{rd}$ 40 MHz subchannel is to be punctured, and so on, where the 8$^{th}$ puncturing pattern having bitmap index 8 indicates that the 8$^{th}$ 40 MHz subchannel is to be punctured.

Figure 11B:
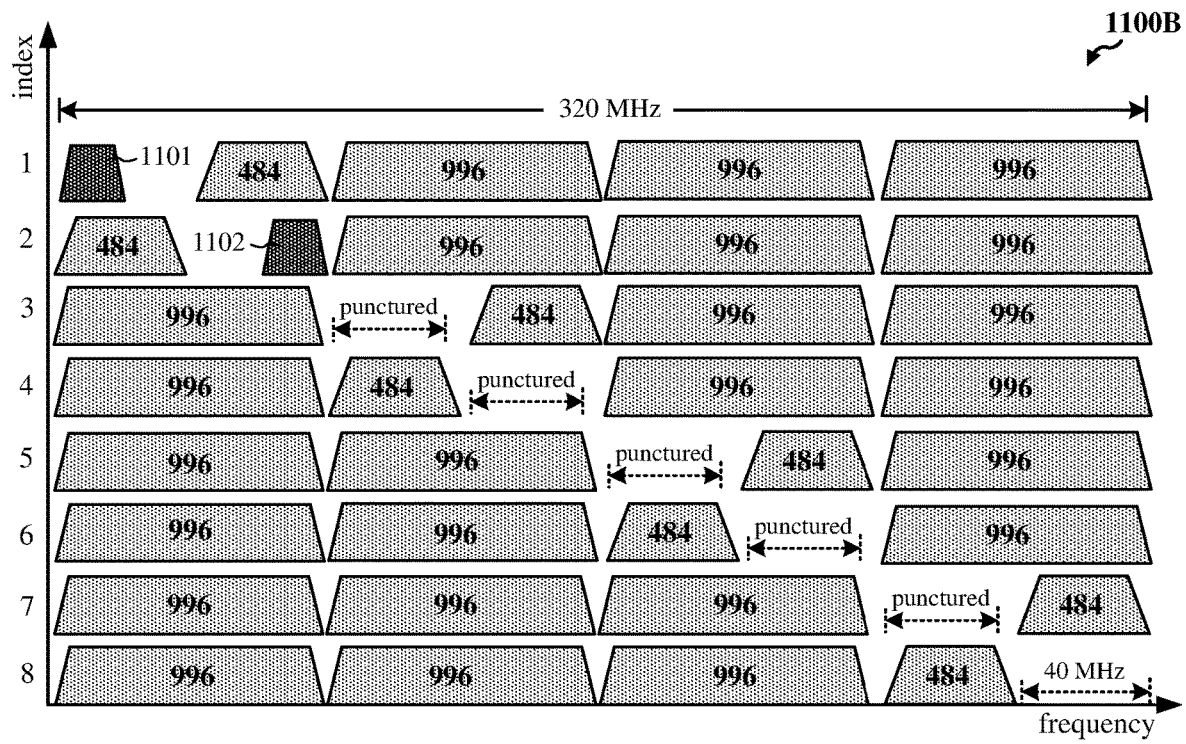
FIG. 11B shows an example set of puncturing patterns useable for wireless communications over a 320 MHz bandwidth according to another wireless communication protocol release.

FIG. 11B shows an example set of puncturing patterns 1100B useable for wireless transmissions over a 320 MHz bandwidth according to another wireless communication protocol release. In some instances, the set of puncturing patterns 1100B may be defined by a second release (Release 2) of the IEEE 802.11be amendment. The set of puncturing patterns 1100B includes 8 puncturing patterns having bitmap indices 1-8 that indicate different 40 MHz subchannels of the 320 MHz frequency bandwidth that are to be punctured. The six puncturing patterns having bitmap indices 3-8 are the same as the six corresponding puncturing patterns of FIG. 11A having respective bitmap indices 3-8.

However, the 1$^{st}$ and 2$^{nd}$ puncturing patterns of FIG. 11B having respective bitmap indices 1 and 2 are not the same as the 1$^{t}$ and 2$^{nd}$ puncturing patterns, respectively, of FIG. 11A. For example, the 1$^{st}$ puncturing pattern of FIG. 11B includes a non-punctured 20 MHz subchannel 1101 that is not included in the 1$^{st}$ puncturing pattern of FIG. 11A, and the 2$^{nd}$ puncturing pattern of FIG. 11B includes a non-punctured 20 MHz subchannel 1102 that is not included in the 2$^{nd}$ puncturing pattern of FIG. 11A. As such, each of the 1$^{st}$ and 2$^{nd}$ puncturing patterns of FIG. 11B may provide an additional 20 MHz of usable frequency bandwidth, as compared to the 1$^{st}$ and 2$^{nd}$ puncturing patterns of FIG. 11A. Inclusion of these additional non-punctured 20 MHz subchannels in the 1$^{st}$ and 2$^{nd}$ puncturing patterns of FIG. 11B also provides a smaller puncturing granularity. That is, while the puncturing patterns of FIG. 11A specify only 40 MHz punctured subchannels, the 1$^{st}$ and 2$^{nd}$ puncturing patterns of FIG. 11B specify 20 MHz punctured subchannels and 40 MHz punctured subchannels.

In some implementations, a 16-bit bitmap may be used to represent the puncturing patterns 1100B of FIG. 11B. In some instances, each bit of the 16-bit bitmap may indicate whether a corresponding 20 MHz subchannel of the 320 MHz frequency bandwidth is to be punctured. In contrast, the puncturing patterns 1100A of FIG. 11A may be represented by the 8-bit bitmap 820 of FIG. 8C, where each of the 8 bits indicates whether a corresponding 40 MHz subchannel of the 320 MHz frequency bandwidth is to be punctured. In this way, using the 16-bit bitmap to represent the set of puncturing patterns 1100B may provide a smaller puncturing granularity than the 8-bit bitmap 820 of FIG. 8C.

Figure 12A:
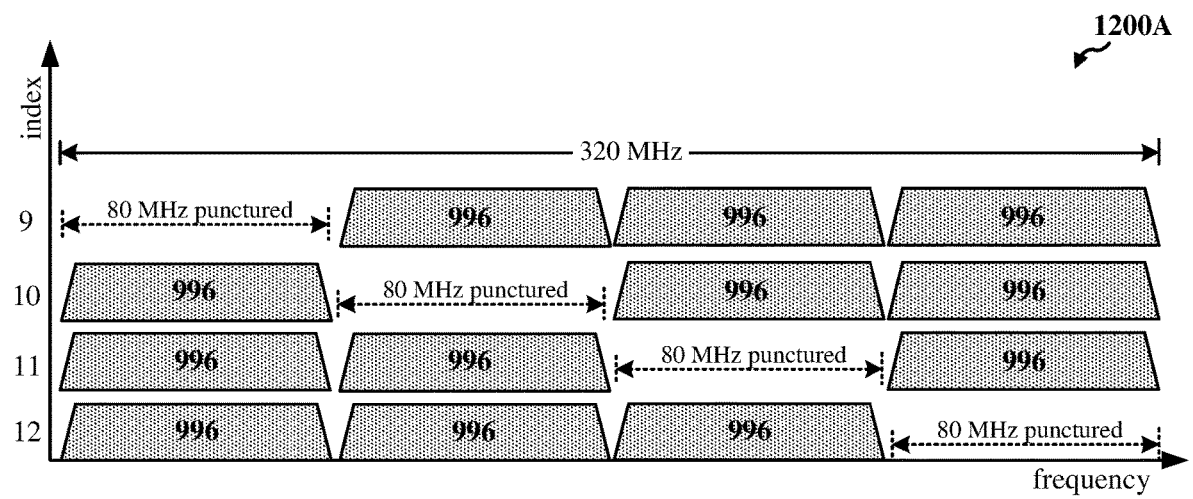
FIG. 12A shows an example set of puncturing patterns useable for wireless communications over a 320 MHz bandwidth according to one wireless communication protocol release.

FIG. 12A shows an example set of puncturing patterns 1200A useable for wireless transmissions over a 320 MHz bandwidth according to one wireless communication protocol release. In some instances, the set of puncturing patterns 1200A may be defined by Release 1 of the IEEE 802.11be amendment. The set of puncturing patterns 1200A includes 4 puncturing patterns having bitmap indices 9-12 corresponding to bitmaps 9-12, respectively, of FIG. 8C. Each of the 4 puncturing patterns indicates a different 80 MHz subchannel of the 320 MHz frequency bandwidth that is to be punctured. For example, the 1$^{st}$ puncturing pattern having bitmap index 9 indicates that the 1$^{st}$ 80 MHz subchannel is to be punctured, the 2$^{nd}$ puncturing pattern having bitmap index 10 indicates that the 2$^{nd}$ 80 MHz subchannel is to be punctured, the 3$^{rd}$ puncturing pattern having bitmap index 11 indicates that the 3$^{rd}$ 80 MHz subchannel is to be punctured, and the 4$^{th}$ puncturing pattern having bitmap index 12 indicates that the 4$^{th}$ 80 MHz subchannel is to be punctured.

Figure 12B:
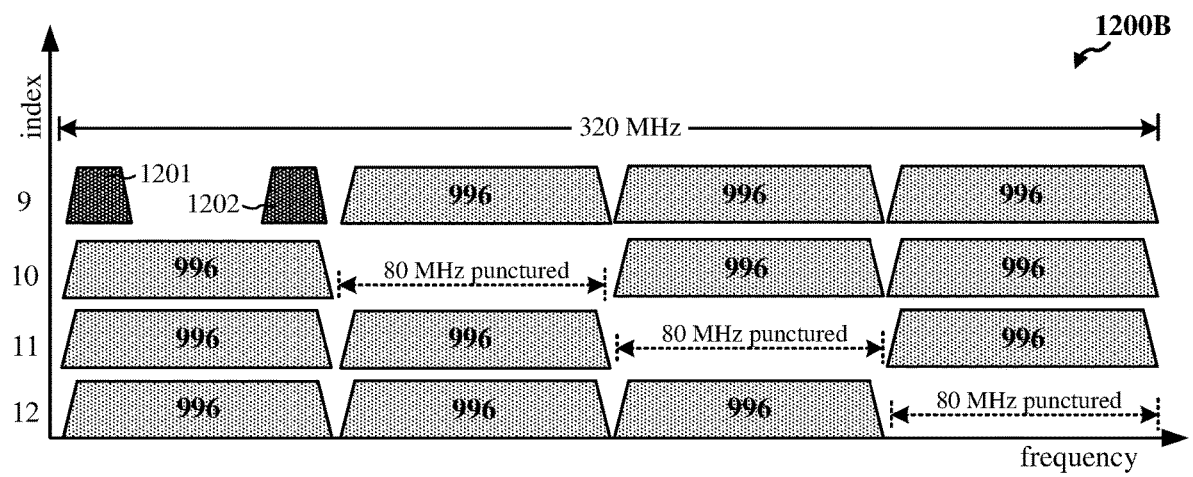
FIG. 12B shows an example set of puncturing patterns useable for wireless communications over a 320 MHz bandwidth according to another wireless communication protocol release.

FIG. 12B shows an example set of puncturing patterns 1200B useable for wireless transmissions over a 320 MHz bandwidth according to another wireless communication protocol release. In some instances, the set of puncturing patterns 1200B may be defined by Release 2 of the IEEE 802.11be amendment. The set of puncturing patterns 1200B includes 4 puncturing patterns having bitmap indices 9-12 that indicate different 80 MHz subchannels of the 320 MHz frequency bandwidth that are to be punctured. The three puncturing patterns having bitmap indices 10-12 are the same as the three corresponding puncturing patterns of FIG. 12A having respective bitmap indices 10-12.

However, the 1$^{st}$ puncturing pattern of FIG. 12B having bitmap index 9 is not the same as the corresponding 1$^{st}$ puncturing pattern of FIG. 12A. For example, the 1$^{st}$ puncturing pattern of FIG. 12B includes 2 non-punctured 20 MHz subchannels 1201 and 1202 that are not included in the 1$^{st}$ puncturing pattern of FIG. 12A. As such, the 1$^{st}$ puncturing pattern of FIG. 12B may provide an additional 40 MHz of usable frequency bandwidth, as compared to the 1$^{st}$ puncturing pattern of FIG. 12A. Inclusion of these additional non-punctured 20 MHz subchannels in the 1$^{st}$ puncturing pattern of FIG. 12B also provides a smaller puncturing granularity. That is, while the puncturing patterns of FIG. 12A specify only 80 MHz punctured subchannels, the 1st puncturing pattern of FIG. 12B specifies two adjacent 20 MHz punctured subchannels.

In some implementations, a 16-bit bitmap may be used to represent the puncturing patterns 1200B of FIG. 12B. In some instances, each bit of the 16-bit bitmap may indicate whether a corresponding 20 MHz subchannel of the 320 MHz frequency bandwidth is to be punctured. In contrast, the puncturing patterns 1200A of FIG. 12A are represented by the 8-bit bitmap 820 of FIG. 8C, where each of the 8 bits indicates whether a corresponding 40 MHz subchannel of the 320 MHz frequency bandwidth is to be punctured. In this way, using the 16-bit bitmap to represent the set of puncturing patterns 1200B may provide a smaller puncturing granularity than the 8-bit bitmap 820 of FIG. 8C.

Figure 13A:
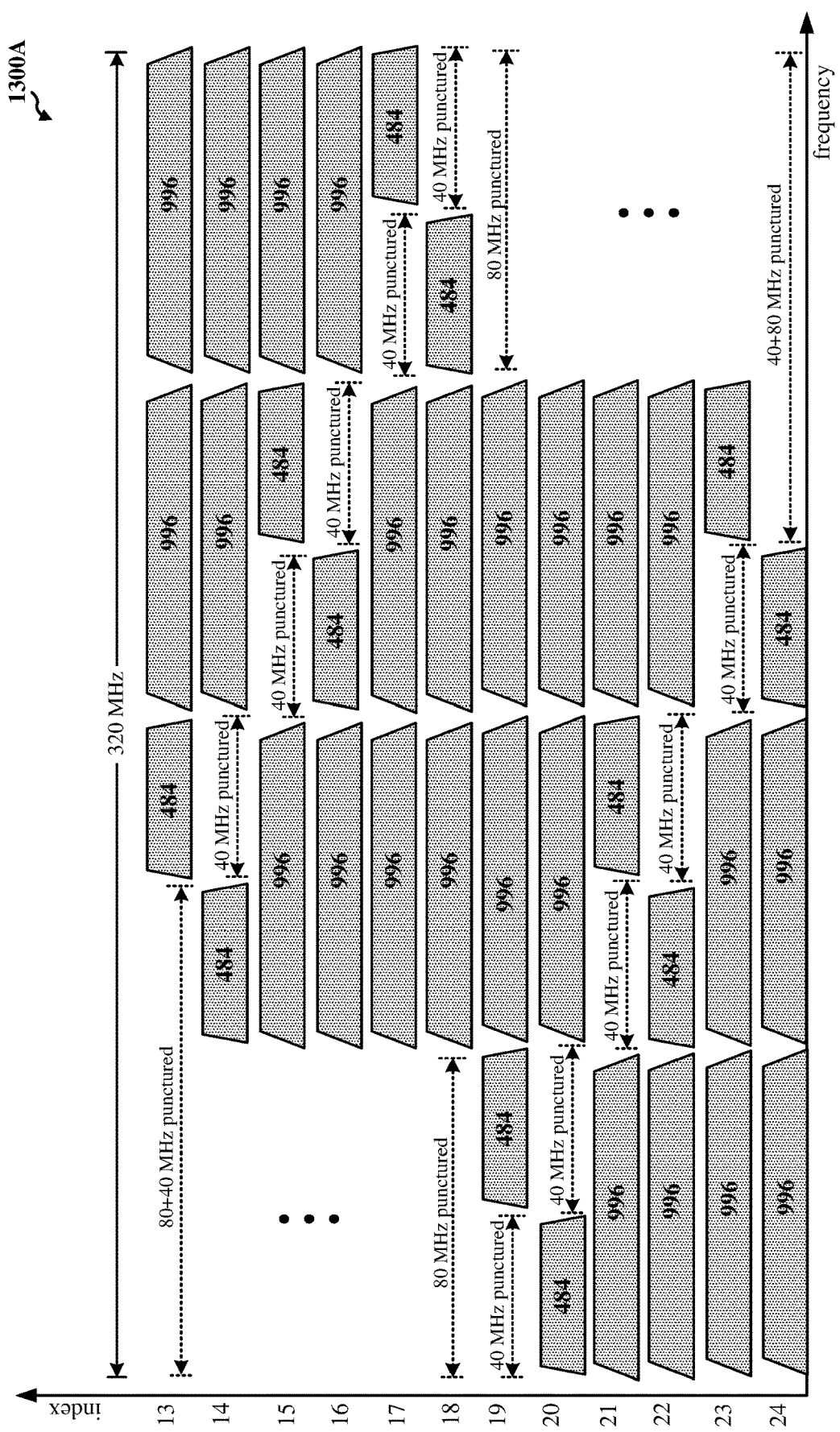
FIG. 13A shows another example set of puncturing patterns useable for wireless communications over a 320 MHz bandwidth according to one wireless communication protocol release.

FIG. 13A shows an example set of puncturing patterns 1300A useable for wireless transmissions over a 320 MHz bandwidth according to one wireless communication protocol release. In some instances, the set of puncturing patterns 1300A may be defined by Release 1 of the IEEE 802.11be amendment. The set of puncturing patterns 1300A includes 12 puncturing patterns having bitmap indices 13-24 corresponding to bitmaps 13-24, respectively, of FIG. 8C. Each of the 12 puncturing patterns indicates a different 80+40 MHz subchannel of the 320 MHz frequency bandwidth that is to be punctured. For example, the $1^{st}$ puncturing pattern having bitmap index 13 indicates that the $1^{st}$, $2^{nd}$, and, and $3^{rd}$ 40 MHz subchannels of the 320 frequency bandwidth are to be punctured, the $2^{nd}$ puncturing pattern having bitmap index 14 indicates that the $1^{st}$, $2^{nd}$, and $4^{th}$ 40 MHz subchannels of the 320 frequency bandwidth are to be punctured, the $3^{rd}$ puncturing pattern having bitmap index 15 indicates that the $1^{st}$, $2^{nd}$, and $5^{th}$ 40 MHz subchannels of the 320 frequency bandwidth are to be punctured, and so on, where the $6^{th}$ puncturing pattern having bitmap index 18 indicates that the $1^{st}$, $2^{nd}$, and $8^{th}$ 40 MHz subchannels of the 320 frequency bandwidth are to be punctured.

Further, the $7^{th}$ puncturing pattern having bitmap index 19 indicates that the $1^{st}$, $7^{nd}$, and $8^{th}$ 40 MHz subchannels of the 320 frequency bandwidth are to be punctured, the $8^{th}$ puncturing pattern having bitmap index 20 indicates that the $2^{nd}$, $7^{nd}$, and $8^{th}$ 40 MHz subchannels of the 320 frequency bandwidth are to be punctured, and so on, where the $12^{th}$ puncturing pattern having bitmap index 24 indicates that the $6^{th}$, $7^{th}$, and $8^{th}$ 40 MHz subchannels of the 320 frequency bandwidth are to be punctured. Note that the $1^{st}$ and $2^{nd}$ 40 MHz subchannels may be collectively referred to as the first 80 MHz subchannel, and the $7^{th}$ and $8^{th}$ 40 MHz subchannels may be collectively referred to as the last 80 MHz subchannel.

Figure 13B:
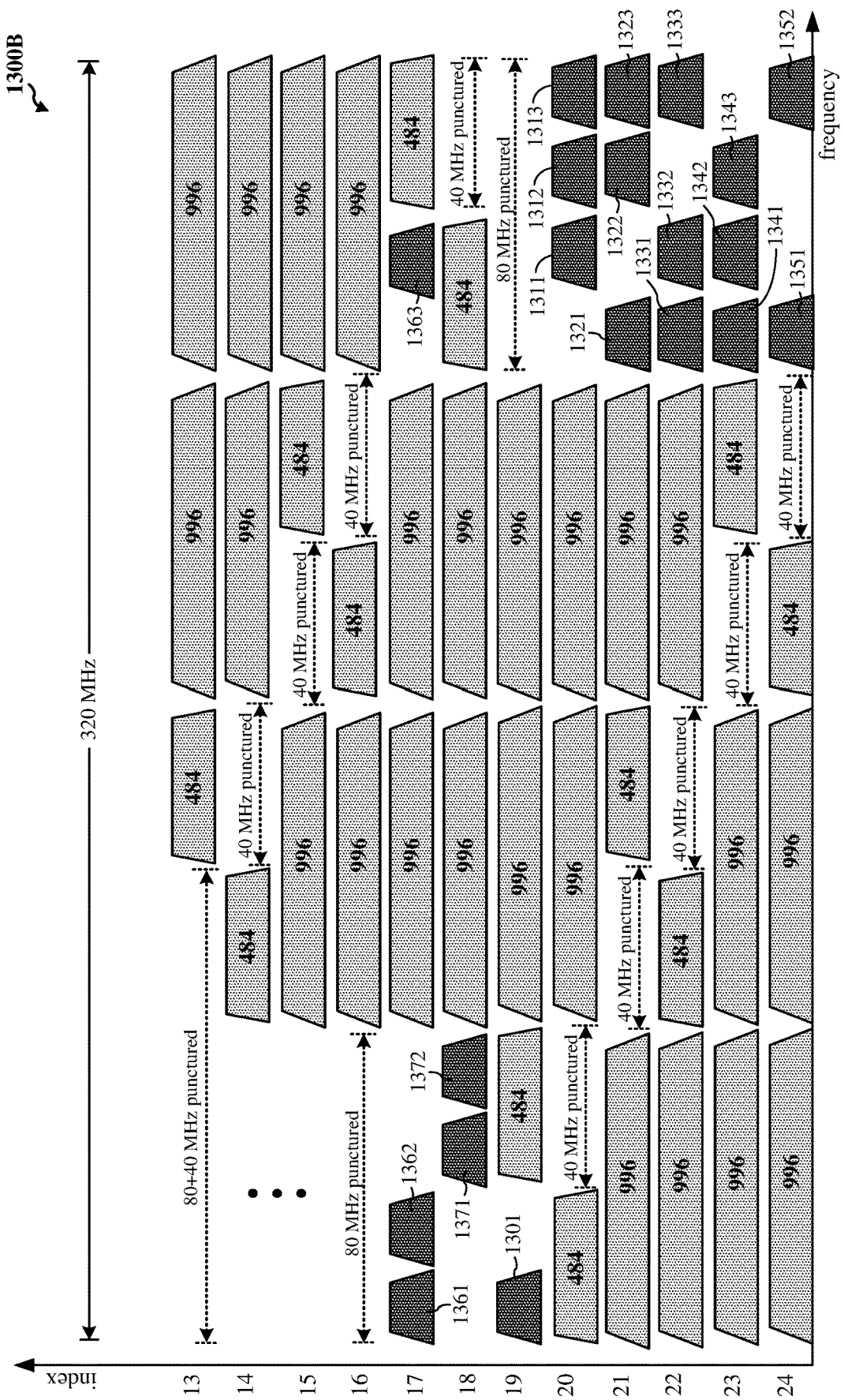
FIG. 13B shows another example set of puncturing patterns useable for wireless communications over a 320 MHz bandwidth according to another wireless communication protocol release.

FIG. 13B shows an example set of puncturing patterns 1300B useable for wireless transmissions over a 320 MHz bandwidth according to another wireless communication protocol release. In some instances, the set of puncturing patterns 1300B may be defined by Release 2 of the IEEE 802.11be amendment. The set of puncturing patterns 1300B includes 12 puncturing patterns having bitmap indices 13-24 that indicate different 80+40 MHz subchannels of the 320 MHz frequency bandwidth that are to be punctured. The four puncturing patterns having bitmap indices 13-16 are the same as the four corresponding puncturing patterns of FIG. 13A having respective bitmap indices 13-16.

However, the puncturing patterns of FIG. 13B having bitmap indices 17-24 are not the same as the corresponding puncturing patterns of FIG. 13A having respective indices 17-24. For example, the puncturing pattern of FIG. 13B having index 19 includes a non-punctured 20 MHz subchannel 1301 that is not included in the corresponding puncturing pattern of FIG. 13A. As such, the puncturing pattern of FIG. 13B having index 19 may provide an additional 20 MHz of usable frequency bandwidth as compared to the corresponding puncturing pattern of FIG. 13A. Inclusion of this additional 20 MHz non-punctured subchannel in the puncturing pattern of FIG. 13B also provides a smaller puncturing granularity, as discussed.

The puncturing pattern of FIG. 13B having index 20 includes 3 non-punctured 20 MHz subchannels 1311-1313 that are not included in the corresponding puncturing pattern of FIG. 13A. As such, the puncturing pattern of FIG. 13B having index 20 may provide an additional 60 MHz of usable frequency bandwidth as compared to the corresponding puncturing pattern of FIG. 13A. The puncturing patterns of FIG. 13B having respective bitmap indices 17, 21, 22, and 23 also include 3 non-punctured 20 MHz subchannels that are not included in the corresponding puncturing patterns of FIG. 13A, and thus may also provide an additional 60 MHz of usable frequency bandwidth as compared to the corresponding puncturing patterns of FIG. 13A. Inclusion of these three additional 20 MHz non-punctured subchannels in the puncturing patterns of FIG. 13B also provides a smaller puncturing granularity. That is, while the puncturing patterns of FIG. 13A specify 40 MHz and 80 MHz punctured subchannels, the puncturing patterns having respective indices 17, 20, 21, 22, and 23 of FIG. 13B specify 20 MHz punctured subchannels, 40 MHz punctured subchannels, and 80 MHz punctured subchannels.

The puncturing pattern of FIG. 13B having index 18 includes 2 non-punctured 20 MHz subchannels 1371-1372 that are not included in the corresponding puncturing pattern of FIG. 13A. Similarly, the puncturing pattern of FIG. 13B having bitmap index 24 includes 2 non-punctured 20 MHz subchannels 1351-1352 that are not included in the corresponding puncturing pattern of FIG. 13A. As such, the puncturing patterns of FIG. 13B having respective indices 18 and 24 may provide an additional 40 MHz of usable frequency bandwidth as compared to the corresponding puncturing patterns of FIG. 13A. Inclusion of these two additional 20 MHz non-punctured subchannels in the puncturing patterns of FIG. 13B also provides a smaller puncturing granularity, as discussed.

In some implementations, the bitmaps 810, 820, and 830 of FIGS. 8A, 8B, and 8C may be configured as 16-bit bitmaps to provide compatibility with wireless communication protocol releases that use 16-bit bitmaps to indicate which puncturing pattern of a set of puncturing patterns is to be used for transmitting or receiving data over a wireless channel. For example, referring also to FIG. 8C, the 8-bit bitmap 830 equal to [x1111111] may be configured as a 16-bit bitmap equal to [xx1111111111111], where each bit in the 8-bit bitmap 830 indicates whether a corresponding 40 MHz subchannel of a 160 MHz frequency bandwidth is punctured, and each bit in the corresponding 16-bit bitmap indicates whether a respective 20 MHz subchannel of the 160 MHz frequency bandwidth is punctured. For another example, the 8-bit bitmap 830 equal to [xx111111] may be configured as a 16-bit bitmap equal to [xxxx111111111111], where each bit in the 8-bit bitmap 830 indicates whether a corresponding 40 MHz subchannel of the 160 MHz frequency bandwidth is punctured, and each bit in the corresponding 16-bit bitmap indicates whether a respective 20 MHz subchannel of the 160 MHz frequency bandwidth is punctured. For another example, the 8-bit bitmap 830 equal to [xx1111x1] may be configured as a 16-bit bitmap equal to [xxxx11111111xx11], where each bit in the 8-bit bitmap 830 indicates whether a corresponding 40 MHz subchannel of a 160 MHz frequency bandwidth is punctured, and each bit in the corresponding 16-bit bitmap indicates whether a respective 20 MHz subchannel of the 160 MHz frequency bandwidth is punctured.

FIG. 13C shows different configurations of a 16-bit bitmap 1350 indicating the puncturing patterns 1100A, 1200A, and 1300A of respective FIGS. 11A, 12A, and 13A according to some implementations. For example, the bitmap 1350 having index 1 shown as [xx1111111111111111] indicates the puncturing pattern 1100A having index 1 of FIG. 11A, the bitmap having index 9 shown as [xxxx111111111111] indicates the puncturing pattern 1200A having index 1 of FIG. 12A, and so on. For another example, the bitmap having index 13 shown as [xxxxxx1111111111] indicates the puncturing pattern 1300B having index 13 of FIG. 13B, the bitmap having index 14 shown as [xxxx11xx11111111] indicates the puncturing pattern 1300B having index 14 of FIG. 13B, the bitmap having index 15 shown as [xxxx1111xx111111] indicates the puncturing pattern 1300B having index 15 of FIG. 13B, and so on.

FIG. 13D shows different configurations of a 16-bit bitmap 1360 indicating the puncturing patterns of respective FIGS. 11B, 12B, and 13B according to some implementations. For example, the bitmap 1360 having index 1 shown as [1x111111111111111] indicates the puncturing pattern 1100B having index 1 of FIG. 11B, the bitmap having index 9 shown as [1xx1111111111111] indicates the puncturing pattern 1200B having index 1 of FIG. 12B, and so on. For another example, the bitmap having index 13 shown as [xxxxxxx111111111] indicates the puncturing pattern 1300B having index 13 of FIG. 13B, the bitmap having index 14 shown as [xxxxx11xx1111111] indicates the puncturing pattern 1300B having index 14 of FIG. 13B, the bitmap having index 15 shown as [xxxxx1111xx11111] indicates the puncturing pattern 1300B having index 15 of FIG. 13B, and so on.

Figure 14A:
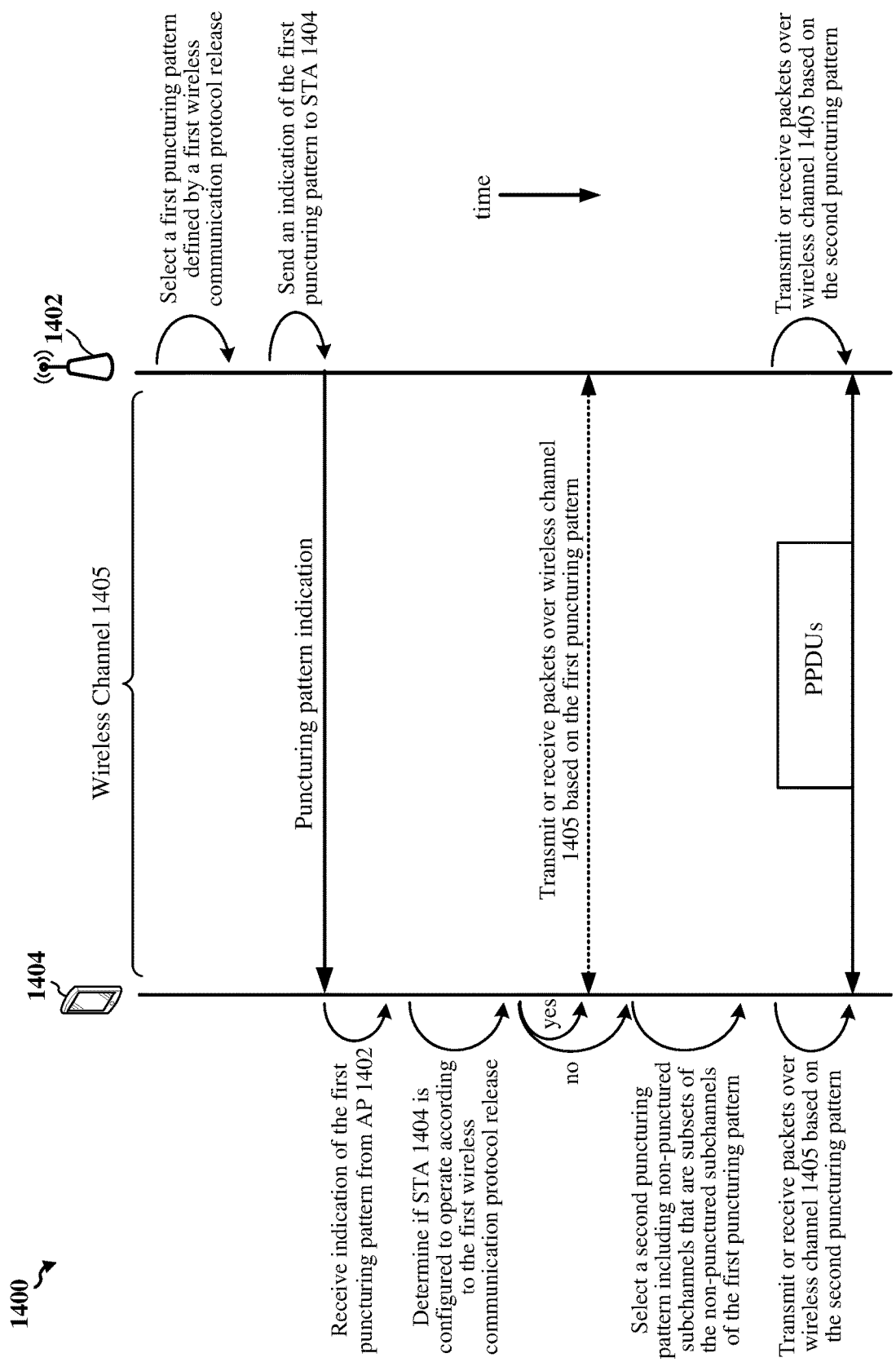
FIG. 14A shows an example sequence diagram for wireless communications that support channel puncturing.

FIG. 14A shows a sequence diagram of an example communication 1400 that supports channel puncturing. In some implementations, the communication 1400 may be performed between an AP 1402 and one or more STAs 1404 (only one STA is shown in FIG. 14A for simplicity). The AP 1402 may be an example of the AP 102 of FIG. 1 or the AP 602 of FIG. 6A, and the STA 1404 may be an example of the STA 104 of FIG. 1 or the STA 604 of FIG. 6B. In other implementations, the communication 1400 may be performed between two APs. In some other implementations, the communication 1400 may be performed between two STAs.

The AP 1402 selects a first puncturing pattern of a set of puncturing patterns for transmitting or receiving data over a wireless channel 1405. The first puncturing pattern is defined by a first wireless communication protocol release. In some instances, the first wireless communication protocol release may be Release 2 of the IEEE 802.11be amendment. The AP 1402 sends an indication of the first puncturing pattern over the wireless channel 1405 to the STA 1404. The indication may be a bitmap including a plurality of bits, where each bit of the bitmap indicates whether a corresponding subchannel of the wireless channel 1405 is punctured (or not punctured). In some implementations, the bitmap may be a 16-bit bitmap, where each bit corresponds to a 20 MHz subchannel of a 320 MHz frequency bandwidth. In some instances, the bitmap may be carried in an EHT operation element of a beacon frame, an association response frame, a probe response frame, an action frame, or another suitable frame. In some other instances, the bitmap may be carried in another portion of a frame.

The STA 1404 receives the indication, and determines whether the STA 1404 is configured to operate according to the first wireless communication protocol release. If the STA 1404 is configured to operate according to the first wireless communication protocol release, the STA 1404 decodes the bitmap, obtains the first puncturing pattern, and transits one or more PPDUs to the AP 1402 over the wireless channel 1405 according to the first puncturing pattern.

Conversely, if the STA 1404 is configured to operate according to a second wireless communication protocol release, the STA 1404 may not be able to decode the bitmap and obtain the first puncturing pattern (such as unless the STA is specifically configured to operate according to the first wireless communication protocol release). In some instances, the second wireless communication protocol release may be Release 1 of the IEEE 802.11be amendment. The STA 1404 may select a puncturing pattern defined by the second wireless communication protocol release to transmit or receive data over the wireless channel 1405.

In some implementations, the STA 1404 selects, from a set of puncturing patterns defined by the second wireless communication protocol release, a second puncturing pattern that includes one or more non-punctured subchannels that are subsets of one or more corresponding non-punctured subchannels of the first puncturing pattern. The second puncturing pattern may also include a non-punctured 20 MHz subchannel corresponding to the primary channel of the AP 1402, for example, so that management frames, control frames, and action frames can be exchanged between the AP 1402 and the STA 1404 over the primary channel. In some instances, the second puncturing pattern indicates a frequency bandwidth of 320 MHz and includes zero or more punctured subchannels having a 40 MHz bandwidth, an 80 MHz bandwidth, or an 80+40 MHz bandwidth. In other instances, the second puncturing pattern indicates a frequency bandwidth of 160 MHz and includes zero or more punctured subchannels having a 40 MHz bandwidth or a 20 MHz bandwidth. In some other instances, the second puncturing pattern indicates a frequency bandwidth of 80 MHz and includes zero or more punctured subchannels having a 20 MHz bandwidth. In some other instances, the second puncturing pattern indicates a frequency bandwidth of 40 MHz without channel puncturing. In some other instances, the second puncturing pattern indicates frequency bandwidth of 20 MHz without channel puncturing.

In some implementations, the STA 1404 selects the second puncturing pattern based on a closest match between the bitmap received from the AP 1402 and one or more stored bitmaps corresponding to the set of puncturing patterns defined by the second wireless communication protocol release. In some instances, the STA 1404 stores a plurality of 16-bit bitmaps that represent the set of puncturing patterns defined by the second wireless communication protocol release. That is, the 4-bit bitmaps 810 of FIG. 8A and the 8-bit bitmaps 820 and 830 of respective FIGS. 8B and 8C may be converted to 16-bit bitmaps, as discussed above with reference to FIG. 13C. For example, if the AP sends an indication carrying a 16-bit bitmap [1x1111111111x111] and the primary channel of the AP 1402 corresponds to the third bit in the received bitmap, the STA 1404 may compare the received bitmap [1x1111111111x111] with the stored 16-bit bitmaps corresponding to the puncturing patterns defined by the second wireless communication protocol release, some of which are shown in FIG. 13C. In this example, multiple puncturing patterns defined by the second wireless communication protocol release can be used for transmitting data to or receiving data from a STA that is configured to operate according to the second wireless communication protocol release (and not configured to operate according to the first wireless communication protocol release). For example, a stored 16-bit bitmap [xx1xxxxxxxxxxxxx] derived from the 20 MHz bandwidth puncturing pattern bitmaps of FIG. 8A and a stored 16-bit bitmap [xx1111111111xxxx] derived from the 320 MHz bandwidth puncturing pattern bitmaps of FIG. 8C may both match the received puncturing pattern bitmap. Between the two example matching bitmaps, the bitmap=[xx1111111111xxxx] most closely matches the received 16-bit bitmap [1x1111111111x111]. The matching 16-bit bitmap [xx1111111111xxxx] indicates the puncturing pattern 1300A of FIG. 13A having index 19. The STA 1404 may use the puncturing pattern 1300A having index 19 to transmit or receive data over the wireless channel 1405 to comply with the puncturing pattern indicated by the AP 1402, for example, because the non-punctured subchannels of the stored matching puncturing pattern are subsets of the non-punctured subchannels of the puncturing pattern indicated by the AP 1402.

If more than one of the bitmaps corresponding to the set of puncturing patterns defined by the second wireless communication protocol release matches the bitmap provided by the AP 1402, which may indicate that more than one of the corresponding puncturing patterns defined by the second wireless communication protocol release includes non-punctured subchannels that are subsets of the non-punctured subchannels of the first puncturing pattern selected by the AP 1402, the STA 1404 selects the corresponding puncturing pattern that includes the most non-punctured subchannels. In this way, the STA 1404 may increase or maximize the frequency bandwidth over which packets can be exchanged with the AP 1402.

If more two or more of the corresponding puncturing patterns defined by the second wireless communication protocol release have the same number of non-punctured subchannels (e.g., the most non-punctured subchannels), the STA 1404 may select one of the two or more corresponding puncturing patterns based on their relative frequencies or based on their relative bitmap indices. For example, in some instances, the STA 1404 selects the puncturing pattern of the two or more corresponding puncturing patterns that includes a non-punctured subchannel associated with relatively high frequencies of the wireless channel. In some other instances, the STA 1404 selects the puncturing pattern of the two or more corresponding puncturing patterns that includes a non-punctured subchannel associated with relatively low frequencies of the wireless channel. In this way, if two or more of the puncturing patterns defined by the second wireless communication protocol release include non-punctured subchannels that are subsets of the non-punctured subchannels of the first puncturing pattern and that also include the most non-punctured subchannels, the STA may select one of the two or more corresponding puncturing patterns based on the relative frequencies of their respective non-punctured subchannels. For example, if the STA determines that channel interference on an upper 40 MHz frequency portion of a 320 MHz wireless channel is less than the channel interference on a lower 40 MHz frequency portion of the 320 MHz wireless channel, the STA may select the puncturing pattern that includes non-punctured subchannels in the upper 40 MHz frequency portion of the 320 MHz wireless channel, for example, to minimize packet loss due to channel interference.

In some other instances, the STA 1404 selects the puncturing pattern of the two or more corresponding puncturing patterns that is associated with a bitmap having the highest binary index, or selects the puncturing pattern of the two or more corresponding puncturing patterns that is associated with a bitmap having the lowest highest binary index. The AP 1402 (and other STAs associated with the AP 1402) may also follow this process to determine which of the corresponding puncturing patterns defined by the second wireless communication protocol release is to be used for channel puncturing. In this way, the AP 1402 and STAs 1404 associated with the AP 1402 may select the same puncturing pattern defined by the second wireless communication protocol release without an explicit indication.

Figure 14B:
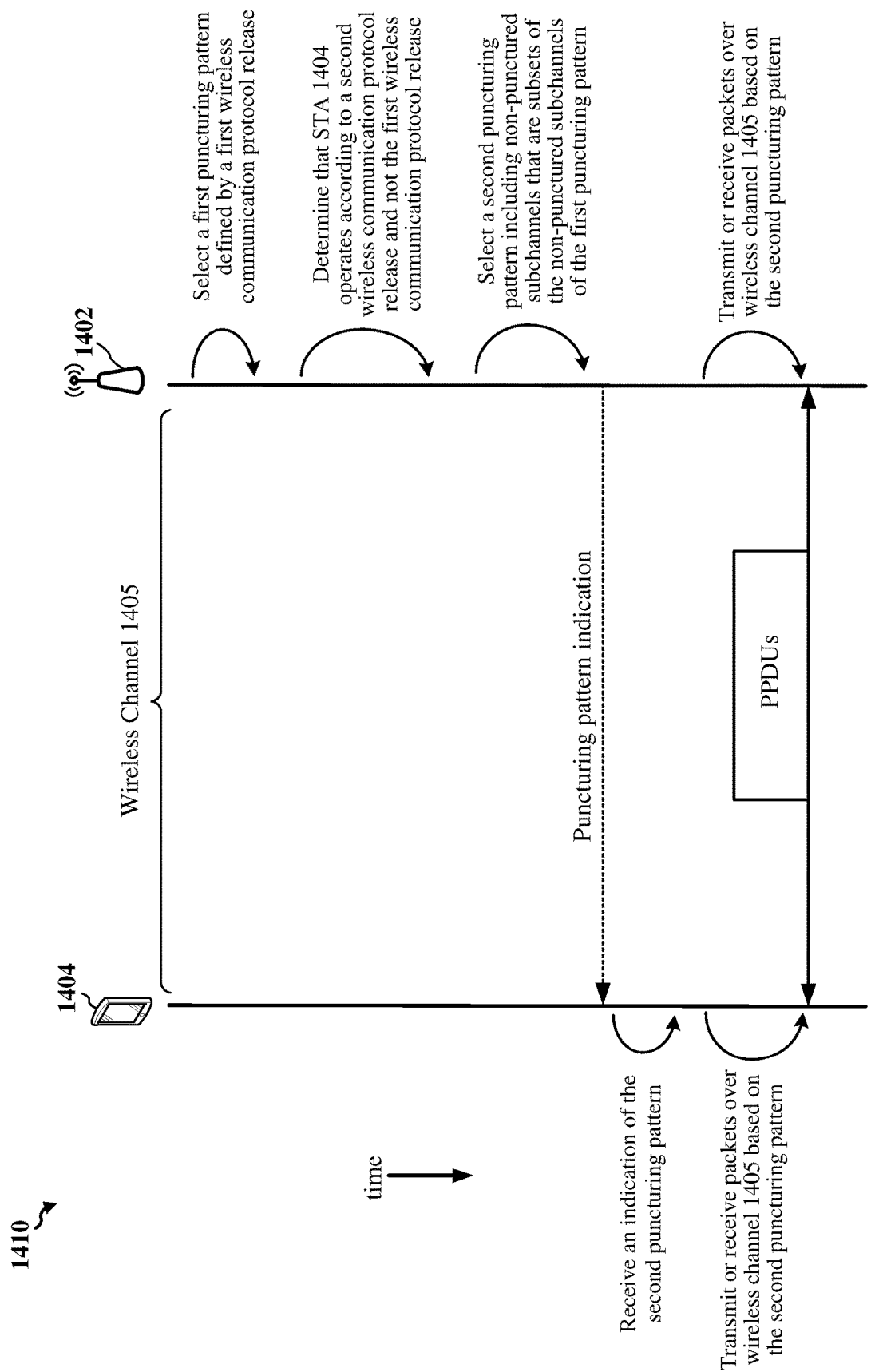
FIG. 14B shows another example sequence diagram for wireless communications that support channel puncturing.

FIG. 14B shows a sequence diagram of another example communication 1410 that supports channel puncturing. In some implementations, the communication 1410 may be performed between the AP 1402 and one or more STAs 1404 (only one STA is shown in FIG. 14B for simplicity). In other implementations, the communication 1410 may be performed between two APs. In some other implementations, the communication 1410 may be performed between two STAs.

The AP 1402 selects a first puncturing pattern of a set of puncturing patterns for transmitting or receiving data over a wireless channel 1405. The first puncturing pattern is defined by a first wireless communication protocol release. In some instances, the first wireless communication protocol release may be Release 2 of the IEEE 802.11be amendment.

The AP 1402 determines that there is a presence of one or more STAs (such as the STA 1404) configured to operate according to the second wireless communication protocol release and not configured to operate according to the first wireless communication protocol release. In response to the determination, the AP 1402 selects a second puncturing pattern from the set of puncturing patterns defined by the second wireless communication protocol release. As described with reference to FIG. 14A, the selected second puncturing pattern includes a non-punctured 20 MHz subchannel corresponding to the primary channel of the AP 1402, for example, so that management frames, control frames, and action frames can be exchanged between the AP 1402 and the STA 1404 over the primary channel. The selected second puncturing pattern also includes one or more non-punctured subchannels that are subsets of one or more corresponding non-punctured subchannels of the first puncturing pattern.

In some implementations, the AP 1402 selects the second puncturing pattern from the set of puncturing patterns based on a match between the bitmap received from the AP 1402 and one or more stored bitmaps corresponding to the set of puncturing patterns defined by the second wireless communication protocol release. In some instances, the AP 1402 may send an indication of the second puncturing pattern over the wireless channel 1405 to the STA 1404. The indication may be a bitmap including a plurality of bits, where each bit of the bitmap indicates whether a corresponding subchannel of the wireless channel 1405 is punctured (or not punctured).

In some other instances, the indication may be a single bit if the number of puncturing pattern candidates for matching the second puncturing pattern selected by the AP 1402 is less than or equal to 2. For example, if the AP indicates a 16-bit bitmap of [11xx11111111x111] based on the first wireless communication protocol release and the primary channel corresponding to the $5^{th}$ bit (from the left of the bitmap), a STA configured to operate according to the second wireless communication protocol release may derive exactly two candidate puncturing patterns for matching the second puncturing pattern: [11xx11111111xxxx] and [xxxx11111111xx11]. That is, these two puncturing patterns derived by the STA 1404 comply with the puncturing pattern [11xx11111111x111] selected by the AP 1402 in that they do not puncture the primary channel and also include the most non-punctured subchannels among the patterns defined in the second wireless communication protocol release. In this case, the AP 1402 may use the single bit to explicitly indicate which of the candidate puncturing patterns has been selected as the second puncturing pattern. The bitmap or bit may be carried in an EHT operation element of a beacon frame, an association response frame, a probe response frame, an action frame, or another suitable frame or packet. In other instances, the bitmap may be carried in another portion of a frame.

The STA 1404 receives the indication, decodes the bitmap or bit provided in the indication, and obtains the second puncturing pattern selected by the AP 1402 for transmitting or receiving data over the wireless channel 1405. Thereafter, the STA 1404 and AP 1402 exchange PPDUs with one another over the wireless channel 1405 based on the selected second puncturing pattern.

In some other implementations, the AP 1402 may send beacon frames or action frames that include two puncturing pattern indication fields. For example, in some instances, a first indication field may carry a bitmap for puncturing patterns defined by the first wireless communication protocol release, and a second indication field may carry a bitmap for puncturing patterns defined by the second wireless communication protocol release.

Figure 15A:
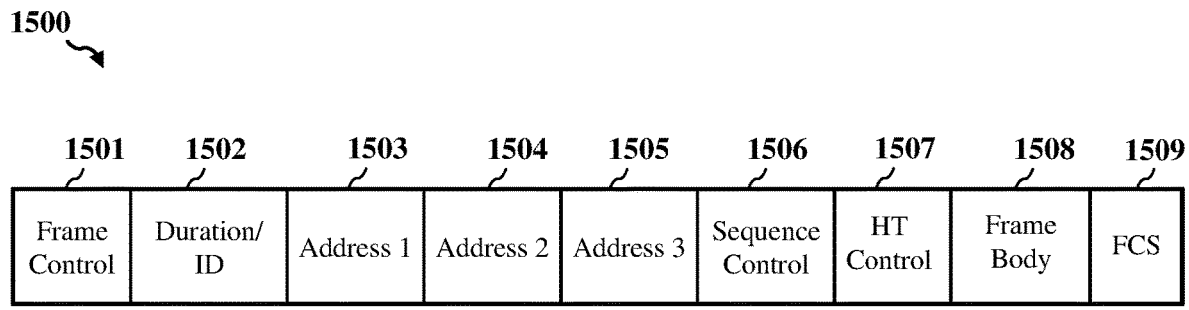
FIG. 15A shows an example beacon frame useable for wireless communications that support channel puncturing.

FIG. 15A shows an example beacon frame 1500 usable for communications between wireless communication devices. The beacon frame 1500 is shown to include a frame control field 1501, a duration field 1502, an address 1 field 1503, an address 2 field 1504, an address 3 field 1505, a sequence control field 1506, an HT control field 1507, a frame body 1508, and an Frame Check Sequence (FCS) field 1509. The frame control field 1501 may carry control information indicating certain parameters of the beacon frame 1500 such as a protocol version, a type, and a subtype. The duration field 1502 may carry information indicating the total length (in bytes) of the beacon frame 1500. The Address 1 field 1503, the Address 2 field 1504, and the Address 3 field 1505 may carry individual or group addresses for all or a portion of the beacon frame 1500, such as a basic service set identifier (BSSID), a source address (SA), a destination address (DA), a transmitting STA address (TA), or a receiving STA address (RA). The sequence control field 1506 may indicate a sequence number, a fragment number, or both, corresponding to the beacon frame 1500. The HT control field 1507 may contain control information for the beacon frame 1500. The FCS field 1509 may contain information for validating or interpreting all or a portion of the beacon frame 1500.

The frame body 1508 may include any suitable number of fields or elements (such as information elements). In some implementations, the beacon frame 1500 may include one or more mandatory fields such as, for example, a timestamp field, a beacon interval field, a capability information field, an SSID field, and a supported rate field, among others. The beacon frame 1500 may also include one or more information elements such as, for example, an EHT Operation Element, a DSSS parameters element, a CF parameters set element, a traffic indication map (TIM) element, among others.

Figure 15B:
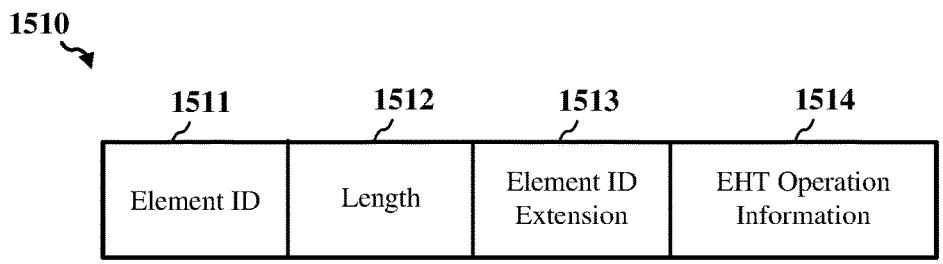
FIG. 15B shows an extremely high-throughput (EHT) operation element useable for wireless communications according to some implementations.

FIG. 15B shows an EHT Operation Element 1510 useable for wireless communications according to some implementations. The EHT operation element 1510 may include an Element ID field 1511, a length field 1512, an Element ID extension field 1513, and an EHT Operation Information field 1514. The Element ID field 1511 carries information indicating the type and format of the information element 1510. The length field 1512 carries information indicating the length or size of the information element 1510. The Element ID extension field 1513 carries additional information indicating the type and format of the information element 1510. The EHT Operation Information field 1514 may be used carry a bitmap indicating which of a plurality of puncturing patterns is to be used for channel puncturing.

Figure 15C:
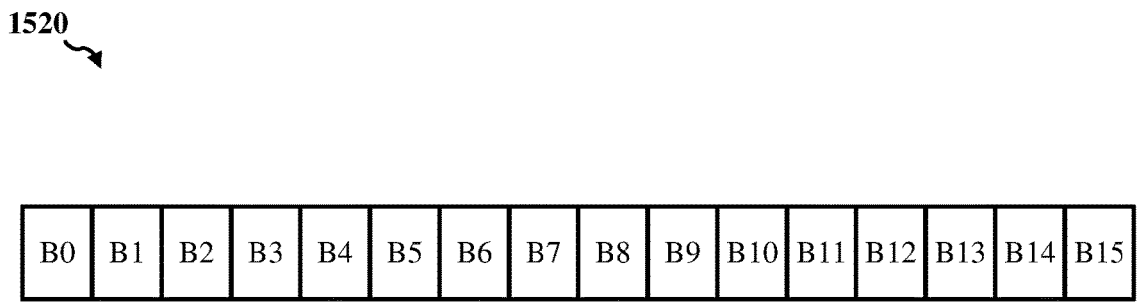
FIG. 15C shows an example bitmap useable for indicating channel puncturing patterns according to some implementations.

FIG. 15C shows an example bitmap 1520 useable for wireless communications with channel puncturing. The bitmap 1520 is shown to include sixteen bits B0-B15, and may be used to indicate a channel puncturing pattern to transmit or receive use for transmitting or receiving data over a wireless channel. In some implementations, each of the sixteen bits B0-B15 may indicate whether a corresponding subchannel of 16 subchannels of a wireless channel is to be punctured (or not punctured).

Figure 16:
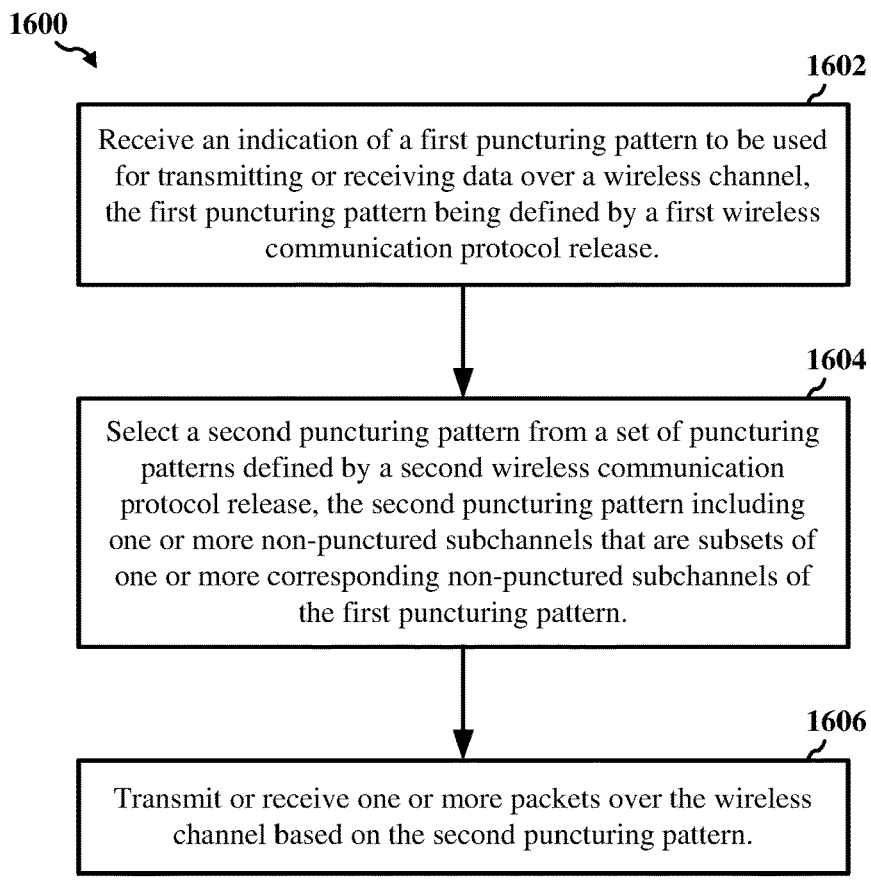
FIG. 16 shows a flowchart illustrating an example process for wireless communication that supports channel puncturing according to some implementations.

FIG. 16 shows a flowchart illustrating an example process 1600 for wireless communication that supports channel puncturing according to some implementations. In some implementations, the process 1600 may be performed by a wireless communication device operating as or within a network node, such as one of the STAs 104 or 604 described above with reference to FIGS. 1 and 6B, respectively. In some other implementations, the process 1600 may be performed by a wireless communication device operating as or within an AP, such as one of the APs 102 or 602 described above with reference to FIGS. 1 and 6A, respectively.

In some implementations, the process 1600 begins at block 1602 with the STA receiving an indication of a first puncturing pattern to be used for transmitting or receiving data over a wireless channel, the first puncturing pattern being defined by a first wireless communication protocol release. The process 1600 proceeds at block 1604 with selecting a second puncturing pattern from a set of puncturing patterns defined by a second wireless communication protocol release, the second puncturing pattern including one or more non-punctured subchannels that are subsets of one or more corresponding non-punctured subchannels of the first puncturing pattern. The process 1600 proceeds at block 1606 with transmitting or receiving one or more packets over the wireless channel based on the second puncturing pattern. In some implementations, the STA may be configured to operate according to the second wireless communication protocol release. In some instances, the STA may not be configured to operate according to the first wireless communication protocol release or may not be able to decode puncturing patterns defined by the first wireless communication protocol release. In some instances, the first wireless communication protocol release may be a second release of the IEEE 802.11be amendment, and the second wireless communication protocol release may be a first release of the IEEE 802.11be amendment.

The second puncturing pattern may include a non-punctured 20 MHz subchannel corresponding to a primary channel of an AP. In some instances, the second puncturing pattern includes a frequency bandwidth of 320 MHz and zero or more punctured subchannels having a 40 MHz bandwidth, an 80 MHz bandwidth, or an 80+40 MHz bandwidth. In other instances, the second puncturing pattern includes a frequency bandwidth of 160 MHz and zero or more punctured subchannels having a 40 MHz bandwidth or a 20 MHz bandwidth. In some other instances, the second puncturing pattern includes a frequency bandwidth of 80 MHz and zero or more punctured subchannels having a 20 MHz bandwidth. In some other instances, the second puncturing pattern includes a frequency bandwidth of 40 MHz without channel puncturing. In some other instances, the second puncturing pattern includes a frequency bandwidth of 20 MHz without channel puncturing.

In various implementations, the indication may be a bitmap including a plurality of bits, with each bit of the bitmap indicating whether a corresponding subchannel of a wireless channel is to be punctured for transmitting or receiving data based on the second puncturing pattern. In some instances, the bitmap may be received in an EHT operation element of a beacon frame. In some other instances, the bitmap may be received in an EHT operation element of an action frame. In some other instances, the bitmap may be received in an EHT operation element of association response frame or a probe response frame. In some implementations, the second puncturing pattern may be selected based on a match between the received bitmap and one or more stored bitmaps corresponding to the set of puncturing patterns defined by the second wireless communication protocol release.

Figure 17:
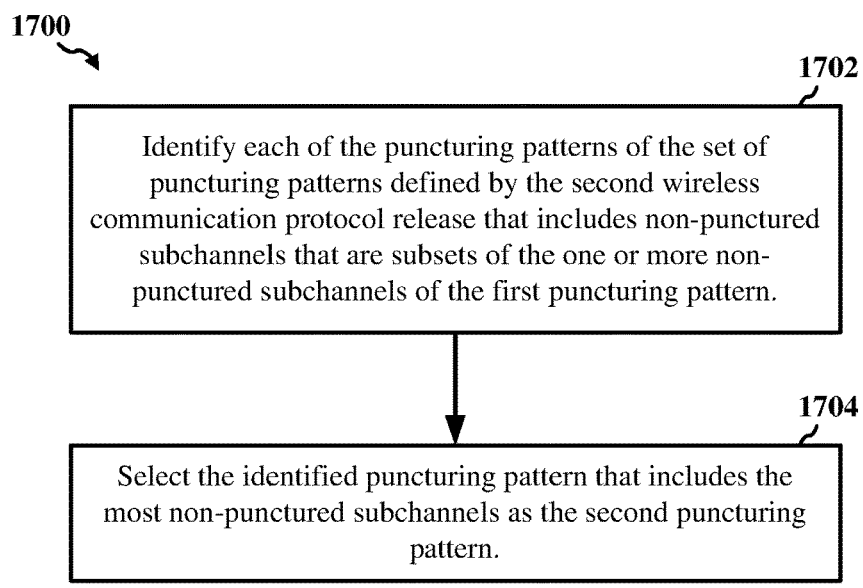
FIG. 17 shows a flowchart illustrating another example process for wireless communication that supports channel puncturing according to some implementations.

FIG. 17 shows a flowchart illustrating an example process 1700 for wireless communication that supports channel puncturing according to some implementations. In some implementations, the process 1700 may be performed by a wireless communication device operating as or within a network node, such as one of the STAs 104 or 604 described above with reference to FIGS. 1 and 6B, respectively. In some other implementations, the process 1700 may be performed by a wireless communication device operating as or within an AP, such as one of the APs 102 or 602 described above with reference to FIGS. 1 and 6A, respectively.

In some implementations, the process 1700 may be one example of selecting the second puncturing pattern in block 1604 of FIG. 16. For example, the process 1700 begins at block 1702 with identifying each of the puncturing patterns of the set of puncturing patterns defined by the second wireless communication protocol release that includes non-punctured subchannels that are subsets of the one or more non-punctured subchannels of the first puncturing pattern. The process 1700 proceeds at block 1704 with selecting the identified puncturing pattern that includes the most non-punctured subchannels as the second puncturing pattern. For example, if two or more puncturing patterns defined by the second wireless communication protocol release are identified as including non-punctured subchannels that are subsets of the one or more non-punctured subchannels of the first puncturing pattern, the STA may select the identified puncturing pattern having the most non-punctured subchannels over which the STA may transmit or receive data. In this way, the STA may select the puncturing pattern defined by the second wireless communication protocol release that provides the widest transmission bandwidth, for example, maximize channel diversity and data throughput over the wireless channel.

Figure 18:
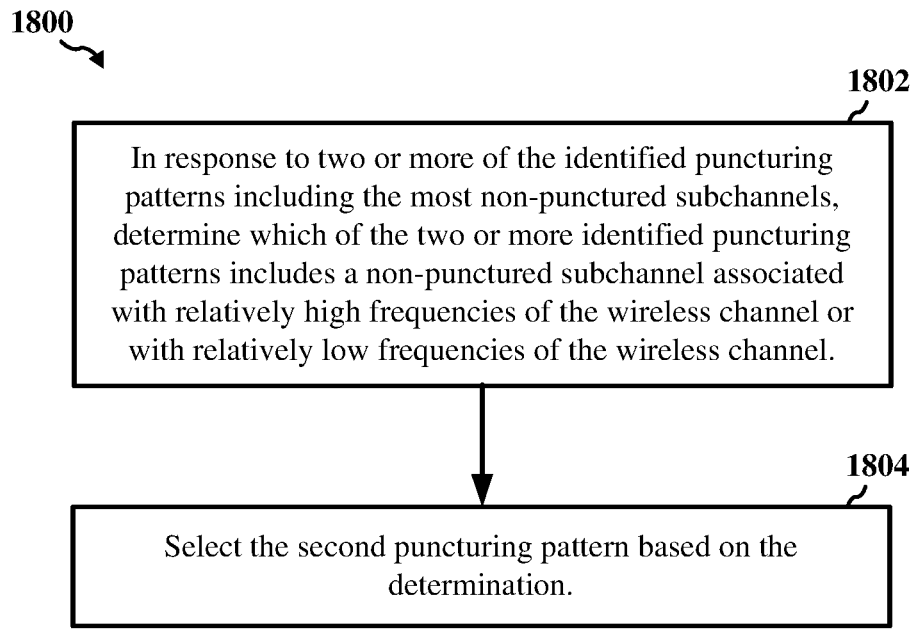
FIG. 18 shows a flowchart illustrating another example process for wireless communication that supports channel puncturing according to some implementations.

FIG. 18 shows a flowchart illustrating an example process 1800 for wireless communication that supports channel puncturing according to some implementations. In some implementations, the process 1800 may be performed by a wireless communication device operating as or within a network node, such as one of the STAs 104 or 604 described above with reference to FIGS. 1 and 6B, respectively. In some other implementations, the process 1800 may be performed by a wireless communication device operating as or within an AP, such as one of the APs 102 or 602 described above with reference to FIGS. 1 and 6A, respectively.

In some implementations, the process 1800 may be performed in conjunction with selecting the identified puncturing pattern in block 1704 of FIG. 17. For example, the process 1800 begins at block 1802 with determining, in response to two or more of the identified puncturing patterns including the most non-punctured subchannels, which of the identified puncturing patterns includes a non-punctured subchannel associated with relatively high frequencies of the wireless channel or with relatively low frequencies of the wireless channel. The process 1800 proceeds at block 1804 with selecting the second puncturing pattern based on the determination. In this way, if two or more of the puncturing patterns defined by the second wireless communication protocol release include non-punctured subchannels that are subsets of the non-punctured subchannels of the first puncturing pattern and that also include the same number of non-punctured subchannels, the STA may select one of the two or more puncturing patterns based on the relative frequencies of their respective non-punctured subchannels. For example, if the STA determines that channel interference on an upper 40 MHz frequency portion of a 320 MHz wireless channel is less than the channel interference on a lower 40 MHz frequency portion of the 320 MHz wireless channel, the STA may select the puncturing pattern that includes non-punctured subchannels in the upper 40 MHz frequency portion of the 320 MHz wireless channel, for example, to minimize packet loss due to channel interference.

Figure 19:
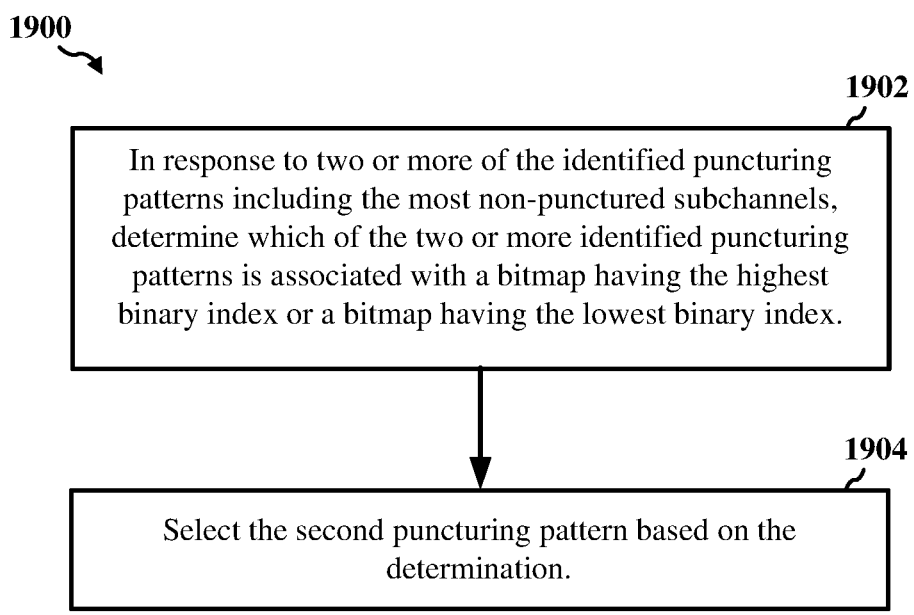
FIG. 19 shows a flowchart illustrating another example process for wireless communication that supports channel puncturing according to some implementations.

FIG. 19 shows a flowchart illustrating an example process 1900 for wireless communication that supports channel puncturing according to some implementations. In some implementations, the process 1900 may be performed by a wireless communication device operating as or within a network node, such as one of the STAs 104 or 604 described above with reference to FIGS. 1 and 6B, respectively. In some other implementations, the process 1900 may be performed by a wireless communication device operating as or within an AP, such as one of the APs 102 or 602 described above with reference to FIGS. 1 and 6A, respectively.

In some implementations, the process 1900 may be performed in conjunction with selecting the identified puncturing pattern in block 1704 of FIG. 17. For example, the process 1900 begins at block 1902 with determining, in response to two or more of the identified puncturing patterns including the most non-punctured subchannels, which of the identified puncturing patterns is associated with a bitmap having the highest binary index or a bitmap having the lowest binary index. The process 1900 proceeds at block 1904 with selecting the second puncturing pattern based on the determination. In this way, if two or more of the puncturing patterns defined by the second wireless communication protocol release include non-punctured subchannels that are subsets of the non-punctured subchannels of the first puncturing pattern and that also include the same number of non-punctured subchannels, the STA may select one of the identified puncturing patterns to transmit or receive data based on their relative bitmap indices. The AP (and other STAs associated with the AP) may also follow this process to determine which of the identified puncturing patterns defined by the second wireless communication protocol release is to be used for channel puncturing. In this way, an AP and the STAs associated with the AP may select the same puncturing pattern defined by the second wireless communication protocol release without an explicit indication.

Figure 20:
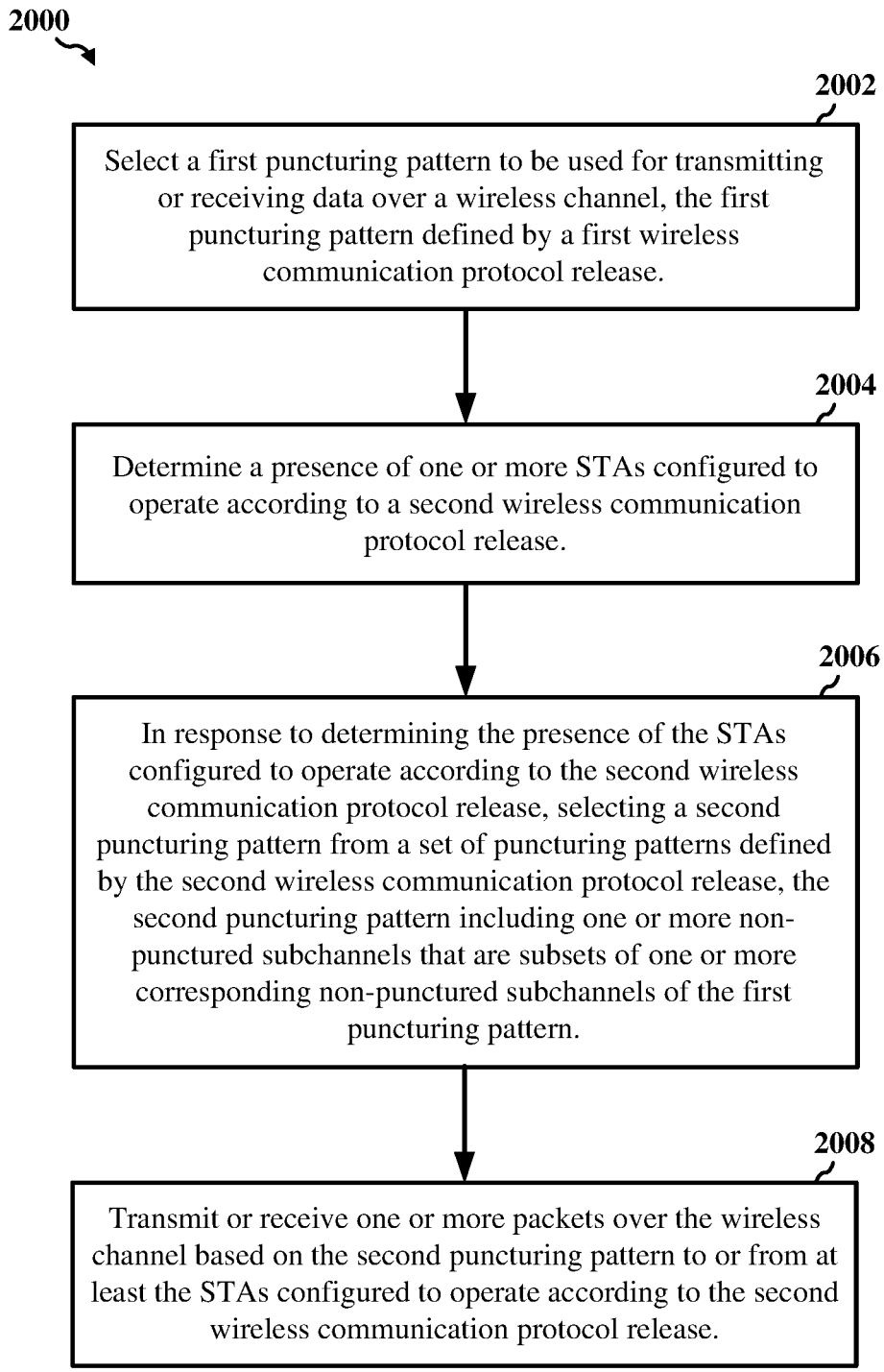
FIG. 20 shows a flowchart illustrating an example process for wireless communication that supports channel puncturing according to some other implementations.

FIG. 20 shows a flowchart illustrating an example process 2000 for wireless communication that supports channel puncturing according to some other implementations. In some implementations, the process 2000 may be performed by a wireless communication device operating as or within an AP, such as one of the APs 102 or 602 described above with reference to FIGS. 1 and 6A, respectively. In some other implementations, the process 2000 may be performed by a wireless communication device operating as or within a network node, such as one of the STAs 104 or 604 described above with reference to FIGS. 1 and 6B, respectively.

In some implementations, the process 2000 begins at block 2002 with selecting a first puncturing pattern to be used for transmitting or receiving data over a wireless channel, the first puncturing pattern defined by a first wireless communication protocol release. The process 2000 proceeds at block 2004 with determining a presence of one or more STAs configured to operate according to a second wireless communication protocol release. The process 2000 proceeds at block 2006 with in response to determining the presence of the one or more STAs configured to operate according to the second wireless communication protocol release, selecting a second puncturing pattern from a set of puncturing patterns defined by the second wireless communication protocol release, the second puncturing pattern including one or more non-punctured subchannels that are subsets of one or more corresponding non-punctured subchannels of the first puncturing pattern. The process 2000 proceeds at block 2008 with transmitting or receiving one or more packets over the wireless channel based on the second puncturing pattern to or from at least the STAs configured to operate according to the second wireless communication protocol release. In some implementations, the first wireless communication protocol release may be a second release of the IEEE 802.11be amendment, and the second wireless communication protocol release may be a first release of the IEEE 802.11be amendment. In some instances, the STA may not be configured to operate according to the first wireless communication protocol release or may not be able to decode puncturing patterns defined by the first wireless communication protocol release.

The second puncturing pattern may include a non-punctured 20 MHz subchannel corresponding to a primary channel of the AP. In some instances, the second puncturing pattern includes a frequency bandwidth of 320 MHz and zero or more punctured subchannels having a 40 MHz bandwidth, an 80 MHz bandwidth, or an 80+40 MHz bandwidth. In other instances, the second puncturing pattern includes a frequency bandwidth of 160 MHz and zero or more punctured subchannels having a 40 MHz bandwidth or a 20 MHz bandwidth. In some other instances, the second puncturing pattern includes a frequency bandwidth of 80 MHz and zero or more punctured subchannels having a 20 MHz bandwidth. In some other instances, the second puncturing pattern includes a frequency bandwidth of 40 MHz without channel puncturing. In some other instances, the second puncturing pattern includes frequency bandwidth of 20 MHz without channel puncturing.

In various implementations, the indication may be a bitmap including a plurality of bits, with each bit of the bitmap indicating whether a corresponding subchannel of a frequency bandwidth is punctured by the second puncturing pattern. In some instances, the bitmap may be transmitted in an EHT operation element of a beacon frame. In some other instances, the bitmap may be transmitted in an EHT operation element of an action frame. In some other instances, the bitmap may be transmitted in an EHT operation element of association response frame or a probe response frame. In some implementations, the second puncturing pattern may be selected based on a match between the received bitmap and one or more stored bitmaps corresponding to the set of puncturing patterns defined by the second wireless communication protocol release.

Figure 21:
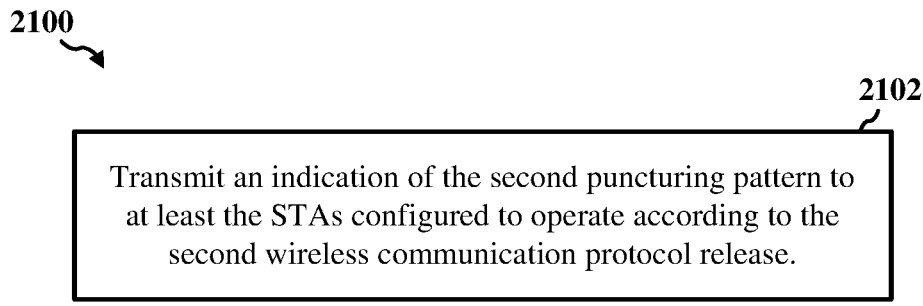
FIG. 21 shows a flowchart illustrating another example process for wireless communication that supports channel puncturing according to some other implementations.

FIG. 21 shows a flowchart illustrating an example process 2100 for wireless communication that supports channel puncturing according to some other implementations. In some implementations, the process 2100 may be performed by a wireless communication device operating as or within an AP, such as one of the APs 102 or 602 described above with reference to FIGS. 1 and 6A, respectively. In some other implementations, the process 2100 may be performed by a wireless communication device operating as or within a network node, such as one of the STAs 104 or 604 described above with reference to FIGS. 1 and 6B, respectively.

In some implementations, the process 2100 may be performed after the process 2000 of FIG. 20. For example, the process 2100 begins at block 2102 with transmitting an indication of the second puncturing pattern to at least the STAs configured to operate according to the second wireless communication protocol release. In some instances, the indication may be a bit carried in an EHT operation element of a beacon frame or action frame.

Figure 22:
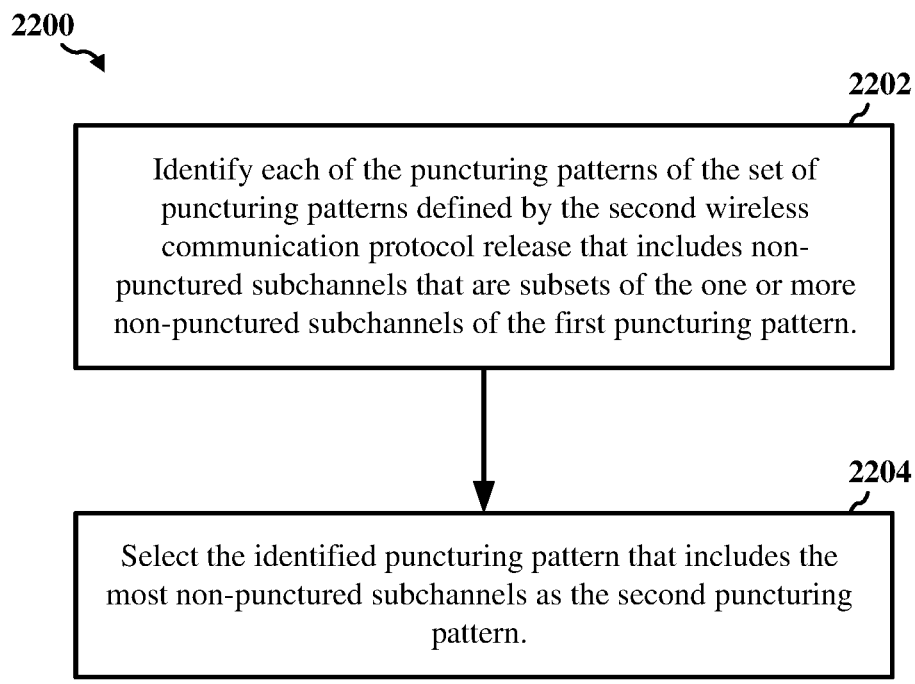
FIG. 22 shows a flowchart illustrating another example process for wireless communication that supports channel puncturing according to some other implementations.

FIG. 22 shows a flowchart illustrating an example process 2200 for wireless communication that supports channel puncturing according to some other implementations. In some implementations, the process 2200 may be performed by a wireless communication device operating as or within an AP, such as one of the APs 102 or 602 described above with reference to FIGS. 1 and 6A, respectively. In some other implementations, the process 2200 may be performed by a wireless communication device operating as or within a network node, such as one of the STAs 104 or 604 described above with reference to FIGS. 1 and 6B, respectively.

In some implementations, the process 2200 may be one example of selecting the second puncturing pattern in block 2006 of FIG. 20. For example, the process 2200 begins at block 2202 with identifying each of the puncturing patterns of the set of puncturing patterns defined by the second wireless communication protocol release that includes non-punctured subchannels that are subsets of the one or more non-punctured subchannels of the first puncturing pattern. The process 2200 proceeds at block 2204 with selecting the identified puncturing pattern that includes the most non-punctured subchannels as the second puncturing pattern. For example, if two or more puncturing patterns defined by the second wireless communication protocol release are identified as including non-punctured subchannels that are subsets of the one or more non-punctured subchannels of the first puncturing pattern, the AP may select the identified puncturing pattern having the most non-punctured subchannels over which the AP may transmit or receive data. In this way, the AP may select the puncturing pattern defined by the second wireless communication protocol release that provides the widest transmission bandwidth, for example, maximize channel diversity and data throughput over the wireless channel.

Figure 23:
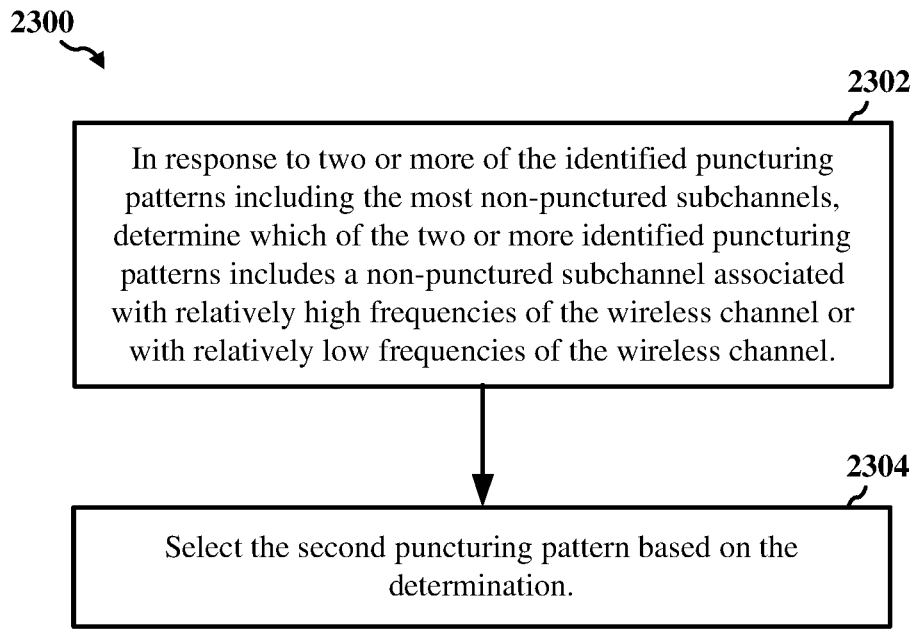
FIG. 23 shows a flowchart illustrating another example process for wireless communication that supports channel puncturing according to some other implementations.

FIG. 23 shows a flowchart illustrating an example process 2300 for wireless communication that supports channel puncturing according to some other implementations. In some implementations, the process 2300 may be performed by a wireless communication device operating as or within an AP, such as one of the APs 102 or 602 described above with reference to FIGS. 1 and 6A, respectively. In some other implementations, the process 2300 may be performed by a wireless communication device operating as or within a network node, such as one of the STAs 104 or 604 described above with reference to FIGS. 1 and 6B, respectively.

In some implementations, the process 2300 may be performed in conjunction with selecting the identified puncturing pattern in block 2204 of FIG. 22. For example, the process 2300 begins at block 2302 with determining, in response to two or more of the identified puncturing patterns including the most non-punctured subchannels, which of the identified puncturing patterns includes a non-punctured subchannel associated with relatively high frequencies of the wireless channel or with relatively low frequencies of the wireless channel. The process 2300 proceeds at block 2304 with selecting the second puncturing pattern based on the determination. In this way, if two or more of the puncturing patterns defined by the second wireless communication protocol release include non-punctured subchannels that are subsets of the non-punctured subchannels of the first puncturing pattern and also include the same number of non-punctured subchannels, the STA may select one of the two or more puncturing patterns based on the relative frequencies of their respective non-punctured subchannels. For example, if the STA determines that channel interference on an upper 40 MHz frequency portion of a 320 MHz wireless channel is less than the channel interference on a lower 40 MHz frequency portion of the 320 MHz wireless channel, the STA may select the puncturing pattern that includes non-punctured subchannels in the upper 40 MHz frequency portion of the 320 MHz wireless channel, for example, to minimize packet loss due to channel interference.

Figure 24:
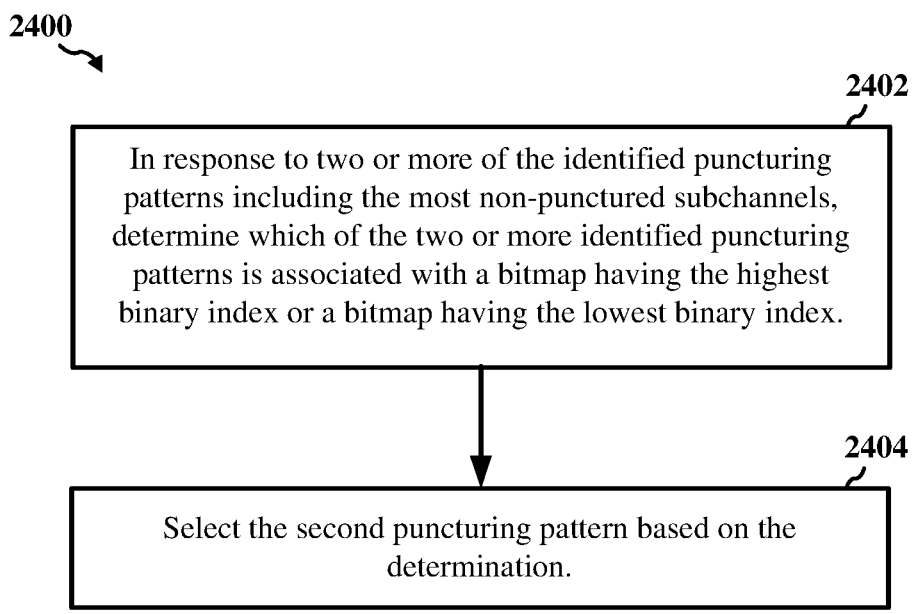
FIG. 24 shows a flowchart illustrating another example process for wireless communication that supports channel puncturing according to some other implementations.

FIG. 24 shows a flowchart illustrating an example process 2400 for wireless communication that supports channel puncturing according to some other implementations. In some implementations, the process 2400 may be performed by a wireless communication device operating as or within an AP, such as one of the APs 102 or 602 described above with reference to FIGS. 1 and 6A, respectively. In some other implementations, the process 2400 may be performed by a wireless communication device operating as or within a network node, such as one of the STAs 104 or 604 described above with reference to FIGS. 1 and 6B, respectively.

In some implementations, the process 2400 may be performed in conjunction with selecting the identified puncturing pattern in block 2204 of FIG. 22. For example, the process 2400 begins at block 2402 with determining, in response to two or more of the identified puncturing patterns including the most non-punctured subchannels, which of the identified puncturing patterns is associated with a bitmap having the highest binary index or a bitmap having the lowest binary index. The process 2400 proceeds at block 2404 with selecting the second puncturing pattern based on the determination. In this way, if two or more of the puncturing patterns defined by the second wireless communication protocol release include non-punctured subchannels that are subsets of the non-punctured subchannels of the first puncturing pattern and also include the same number of non-punctured subchannels, the STA may select one of the identified puncturing patterns to transmit or receive data based on their relative bitmap indices. The AP (and other STAs associated with the AP) may also follow this process to determine which of the identified puncturing patterns defined by the second wireless communication protocol release is to be used for channel puncturing. In this way, an AP and the STAs associated with the AP may select the same puncturing pattern defined by the second wireless communication protocol release without an explicit indication.

Figure 25:
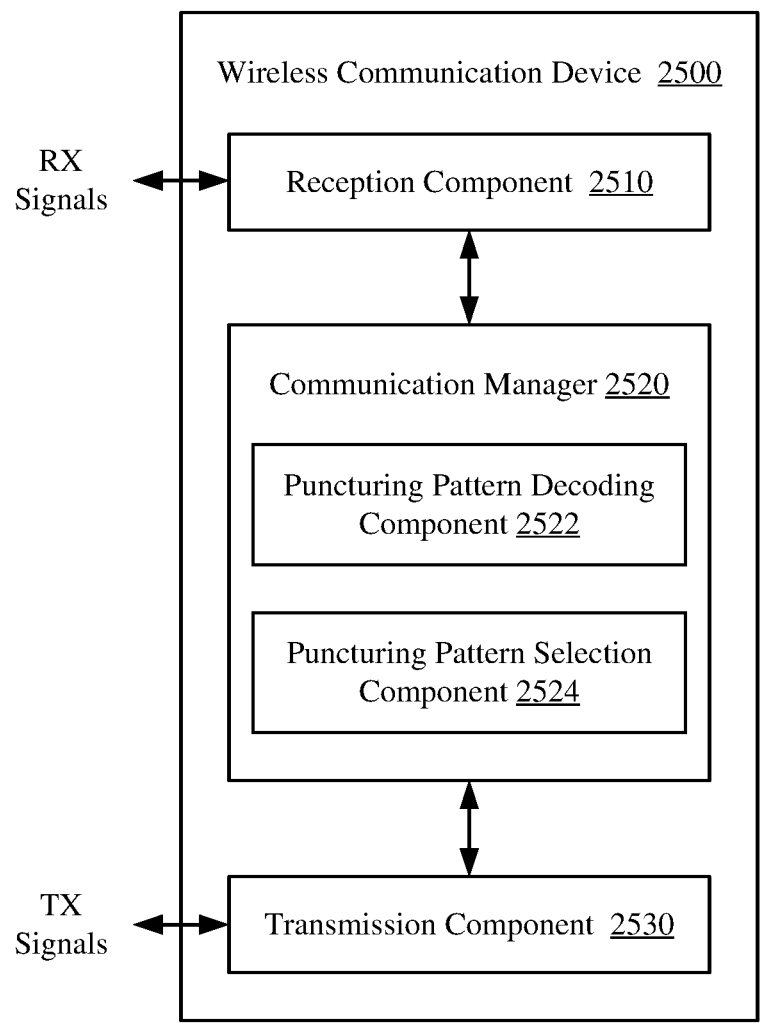
FIG. 25 shows a block diagram of an example wireless communication device according to some implementations.

FIG. 25 shows a block diagram of an example wireless communication device 2500 according to some implementations. In some implementations, the wireless communication device 2500 is configured to perform the communications 1400 of FIG. 14A, the communications 1410 of FIG. 14B, or both. The wireless communication device 2500 can be an example implementation of the wireless communication device 500 described above with reference to FIG. 5. For example, the wireless communication device 2500 can be a chip, SoC, chipset, package or device that includes at least one processor and at least one modem (for example, a Wi-Fi (IEEE 802.11) modem or a cellular modem). In some implementations, the wireless communication device 2500 can be a device for use in a STA, such as one of the STAs 104 and 604 described with reference to FIGS. 1 and 6B, respectively. In some other implementations, the wireless communication device 2500 can be a STA that includes such a chip, SoC, chipset, package or device as well as at least one antenna (such as the antennas 625).

The wireless communication device 2500 includes a reception component 2510, a communication manager 2520, and a transmission component 2530. The communication manager 2520 further includes a puncturing pattern decoding component 2522 and a puncturing pattern selection component 2524. Portions of one or more of the components 2522 and 2524 may be implemented at least in part in hardware or firmware. In some implementations, at least some of the components 2522 and 2524 are implemented at least in part as software stored in a memory (such as the memory 508). For example, portions of one or more of the components 2522 and 2524 can be implemented as non-transitory instructions (or "code") executable by a processor (such as the processor 506) to perform the functions or operations of the respective component.

The reception component 2510 is configured to receive RX signals, over a wireless channel, from one or more other wireless communication devices. The communication manager 2520 is configured to control or manage communications with the one or more other wireless communication devices. In some implementations, the puncturing pattern decoding component 2522 may receive an indication of a first puncturing pattern to be used for transmitting or receiving data over a wireless channel. In some instances, the puncturing pattern decoding component 2522 may determine that the first puncturing pattern is defined by a first wireless communication protocol release. The puncturing pattern selection component 2524 may select a second puncturing pattern from a set of puncturing patterns defined by a second wireless communication protocol release. In some instances, the second puncturing pattern may include one or more non-punctured subchannels that are subsets of one or more corresponding non-punctured subchannels of the first puncturing pattern. The transmission component 2530 is configured to transmit TX signals, over the wireless channel, to one or more other wireless communication devices. In some implementations, the transmission component 2530 may transmit one or more packets over the wireless channel based on the second puncturing pattern.

Figure 26:
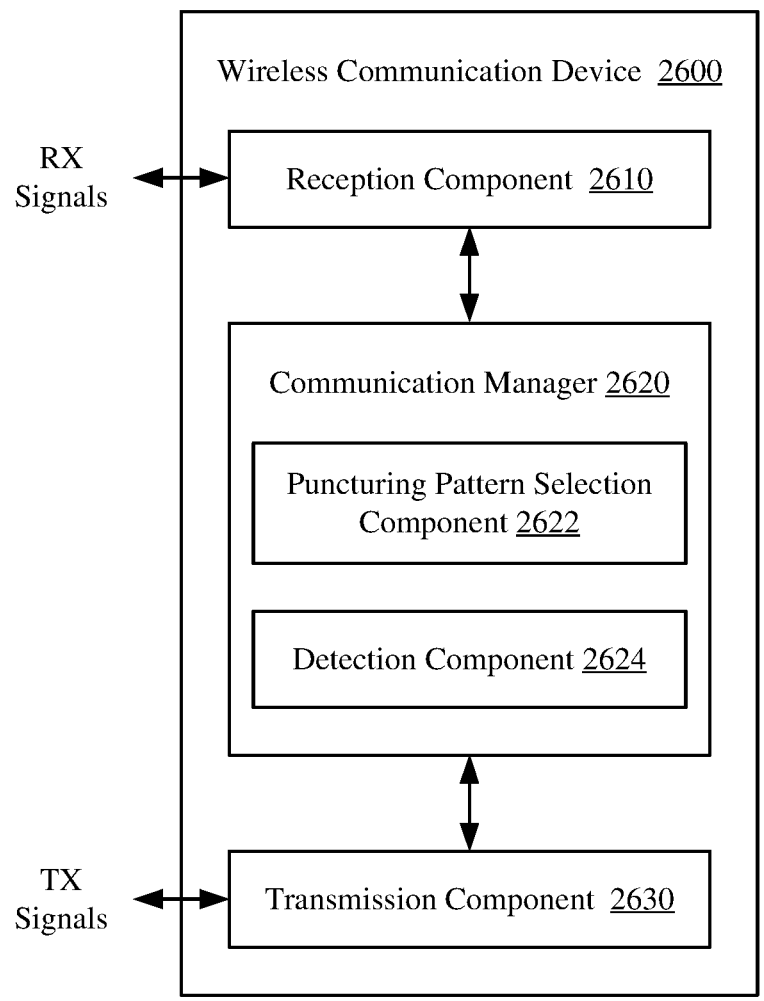
FIG. 26 shows a block diagram of an example wireless communication device according to some other implementations.

FIG. 26 shows a block diagram of an example wireless communication device 2600 according to some other implementations. In some implementations, the wireless communication device 2600 is configured to perform the communications 1400 of FIG. 14A, the communications 1410 of FIG. 14B, or both. The wireless communication device 2600 can be an example implementation of the wireless communication device 500 described above with reference to FIG. 5. For example, the wireless communication device 2600 can be a chip, SoC, chipset, package or device that includes at least one processor and at least one modem (for example, a Wi-Fi (IEEE 802.11) modem or a cellular modem). In some implementations, the wireless communication device 2600 can be a device for use in an AP, such as one of the APs 102 and 602 described with reference to FIGS. 1 and 6A, respectively. In some other implementations, the wireless communication device 2600 can be an AP that includes such a chip, SoC, chipset, package or device as well as at least one antenna (such as the antennas 620).

The wireless communication device 2600 includes a reception component 2610, a communication manager 2620, and a transmission component 2630. The communication manager 2620 further includes a puncturing pattern selection component 2622 and a detection component 2624. Portions of one or more of the components 2622 and 2624 may be implemented at least in part in hardware or firmware. In some implementations, at least some of the components 2622 and 2624 are implemented at least in part as software stored in a memory (such as the memory 508). For example, portions of one or more of the components 2622 and 2624 can be implemented as non-transitory instructions (or "code") executable by a processor (such as the processor 506) to perform the functions or operations of the respective component.

The reception component 2610 is configured to receive RX signals, over a wireless channel, from one or more other wireless communication devices. The communication manager 2620 is configured to control or manage communications with the one or more other wireless communication devices. In some implementations, the puncturing pattern selection component 2622 may select a first puncturing pattern to be used for transmitting or receiving data over a wireless channel, the first puncturing pattern defined by a first wireless communication protocol release. The detection component 2624 is configured to determine a presence of one or more STAs configured to operate according to a second wireless communication protocol release. In some instances, the one or more STAs may not be configured to operate according to the first wireless communication protocol release. The puncturing pattern selection component 2622 is configured to select, in response to determining the presence of the one or more STAs configured to operate according to the second wireless communication protocol release, a second puncturing pattern from a set of puncturing patterns defined by the second wireless communication protocol release. In some instances, the second puncturing pattern includes one or more non-punctured subchannels that are subsets of one or more corresponding non-punctured subchannels of the first puncturing pattern. The transmission component 2630 is configured to transmit TX signals, over the wireless channel, to one or more other wireless communication devices. In some implementations, the transmission component 2630 may transmit one or more packets over the wireless channel to the one or more STAs based on the second puncturing pattern.

Implementation examples are described in the following numbered clauses:

1. A method for wireless communication performed by a wireless station (STA), including:
   receiving an indication of a first puncturing pattern to be used for transmitting or receiving data over a wireless channel, the first puncturing pattern being defined by a first wireless communication protocol release;
   selecting a second puncturing pattern from a set of puncturing patterns defined by a second wireless communication protocol release, the second puncturing pattern including one or more non-punctured subchannels that are subsets of one or more corresponding non-punctured subchannels of the first puncturing pattern; and
   transmitting or receiving one or more packets over the wireless channel based on the second puncturing pattern.

2. The method of clause 1, where the STA is configured to operate according to the second wireless communication protocol release and not configured to operate according to the first wireless communication protocol release.

3. The method of any one or more of clauses 1-2, where the second puncturing pattern includes:
   a frequency bandwidth of 320 MHz and zero or more punctured subchannels having a 40 MHz frequency bandwidth, an 80 MHz frequency bandwidth, or an 80+40 MHz frequency bandwidth;
   a frequency bandwidth of 160 MHz and zero or more punctured subchannels having a 40 MHz frequency bandwidth or a 20 MHz frequency bandwidth;
   a frequency bandwidth of 80 MHz and zero or more punctured subchannels having a 20 MHz frequency bandwidth;
   a frequency bandwidth of 40 MHz without puncturing; or
   a frequency bandwidth of 20 MHz without puncturing.

4. The method of any one or more of clauses 1-3, where the second puncturing pattern includes a non-punctured 20 MHz subchannel corresponding to a primary channel of an access point (AP).

5. The method of any one or more of clauses 1-4, where the indication includes a bitmap including a plurality of bits, each bit of the bitmap indicating whether a corresponding subchannel of the wireless channel is punctured by the first puncturing pattern.

6. The method of clause 5, where the bitmap is received in an extremely high-throughput (EHT) operation element of a beacon frame, an association response frame, a probe response frame, or an action frame.

7. The method of any one or more of clauses 1-6, where selecting the second puncturing pattern includes:
   identifying each of the puncturing patterns of the set of puncturing patterns defined by the second wireless communication protocol release that includes non-punctured subchannels that are subsets of the one or more non-punctured subchannels of the first puncturing pattern; and
   selecting the identified puncturing pattern that includes the most non-punctured subchannels as the second puncturing pattern.

8. The method of clause 7, further including:
   in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
   selecting the second puncturing pattern based on the determination.

9. The method of clause 7, further including:
   in response to two or more of the identified puncturing patterns including the most non-punctured subchannels, determining which of the two or more identified puncturing patterns is associated with a bitmap having the highest binary index or a bitmap having the lowest binary index; and
   selecting the second puncturing pattern based on the determination.

10. The method of any one or more of clauses 1-9, where selecting the second puncturing pattern is based on a match between the received bitmap and one or more stored bitmaps corresponding to the set of puncturing patterns defined by the second wireless communication protocol release.

11. A method for wireless communication performed by a wireless access point (AP), including:
   selecting a first puncturing pattern to be used for transmitting or receiving data over a wireless channel, the first puncturing pattern defined by a first wireless communication protocol release;
   determining a presence of one or more wireless stations (STAs) configured to operate according to a second wireless communication protocol release;
   in response to determining the presence of the one or more STAs configured to operate according to the second wireless communication protocol release, selecting a second puncturing pattern from a set of puncturing patterns defined by the second wireless communication protocol release, the second puncturing pattern including one or more non-punctured subchannels that are subsets of one or more corresponding non-punctured subchannels of the first puncturing pattern; and
   transmitting or receiving one or more packets over the wireless channel based on the second puncturing pattern to or from at least the STAs configured to operate according to the second wireless communication protocol release.

12. The method of clause 11, further including:
   transmitting an indication of the second puncturing pattern to at least the STAs configured to operate according to the second wireless communication protocol release.

13. The method of any one or more of clauses 11-12, where the indication includes a bit carried in an extremely high-throughput (EHT) operation element of a beacon frame, an association response frame, a probe response frame, or an action frame.

14. The method of any one or more of clauses 11-13, where the second puncturing pattern includes:
   a frequency bandwidth of 320 MHz and zero or more punctured subchannels having a 40 MHz frequency bandwidth, having an 80 MHz frequency bandwidth, or an 80+40 MHz frequency bandwidth;
   a frequency bandwidth of 160 MHz and zero or more punctured subchannels having a 40 MHz frequency bandwidth or a 20 MHz frequency bandwidth;
   a frequency bandwidth of 80 MHz and zero or more punctured subchannels having a 20 MHz frequency bandwidth;
   a frequency bandwidth of 40 MHz without puncturing; or
   a frequency bandwidth of 20 MHz without puncturing.

15. The method of any one or more of clauses 11-14, where the second puncturing pattern includes a non-punctured 20 MHz subchannel corresponding to a primary channel of the AP.

16. The method of any one or more of clauses 11-15, where selecting the second puncturing pattern includes:
   identifying each of the puncturing patterns of the set of puncturing patterns defined by the second wireless communication protocol release that includes non-punctured subchannels that are subsets of the one or more non-punctured subchannels of the first puncturing pattern; and
   selecting the identified puncturing pattern that includes the most non-punctured subchannels as the second puncturing pattern.

17. The method of clause 16, further including:
   in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
   selecting the second puncturing pattern based on the determination.

18. The method of clause 16, further including:
   in response to two or more of the identified puncturing patterns including the most non-punctured subchannels, determining which of the two or more identified puncturing patterns is associated with a bitmap having the highest binary index or a bitmap having the lowest binary index; and
   selecting the second puncturing pattern based on the determination.

19. A wireless communication device including:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:
      receive an indication of a first puncturing pattern to be used for transmitting or receiving data over a wireless channel, the first puncturing pattern being defined by a first wireless communication protocol release;
      select a second puncturing pattern from a set of puncturing patterns defined by a second wireless communication protocol release, the second puncturing pattern including one or more non-punctured subchannels that are subsets of one or more corresponding non-punctured subchannels of the first puncturing pattern; and
      transmit or receive one or more packets over the wireless channel based on the second puncturing pattern.

20. The wireless communication device of clause 19, where the indication includes a bitmap including a plurality of bits, each bit of the bitmap indicating whether a corresponding subchannel of the wireless channel is punctured by the first puncturing pattern.

21. The wireless communication device of any one or more of clauses 19-20, where the bitmap is transmitted in an extremely high-throughput (EHT) operation element of a beacon frame, an association response frame, a probe response frame, or an action frame.

22. The wireless communication device of any one or more of clauses 19-21, where execution of the processor-readable code is configured to select the second puncturing pattern by:
   identifying each of the puncturing patterns of the set of puncturing patterns defined by the second wireless communication protocol release that includes non-punctured subchannels that are subsets of the one or more non-punctured subchannels of the first puncturing pattern; and
   selecting the identified puncturing pattern that includes the most non-punctured subchannels as the second puncturing pattern.

23. The wireless communication device of clause 22, where execution of the processor-readable code is further configured to:
in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
selecting the second puncturing pattern based on the determination.

24. The wireless communication device of clause 22, where execution of the processor-readable code is further configured to:
in response to two or more of the identified puncturing patterns including the most non-punctured subchannels, determining which of the two or more identified puncturing patterns is associated with a bitmap having the highest binary index or a bitmap having the lowest binary index; and
selecting the second puncturing pattern based on the determination.

25. The wireless communication device of any one or more of clauses 19-24, where the selection of the second puncturing pattern is based on a match between the received bitmap and one or more stored bitmaps corresponding to the set of puncturing patterns defined by the second wireless communication protocol release.

26. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
  select a first puncturing pattern to be used for transmitting or receiving data over a wireless channel, the first puncturing pattern defined by a first wireless communication protocol release;
  determine a presence of one or more wireless stations (STAs) configured to operate according to a second wireless communication protocol release;
  in response to determining the presence of the one or more STAs configured to operate according to the second wireless communication protocol release, select a second puncturing pattern from a set of puncturing patterns defined by the second wireless communication protocol release, the second puncturing pattern including one or more non-punctured subchannels that are subsets of one or more corresponding non-punctured subchannels of the first puncturing pattern; and
  transmit or receive one or more packets over the wireless channel based on the second puncturing pattern to or from at least the STAs configured to operate according to the second wireless communication protocol release.

27. The wireless communication device of clause 26, where execution of the processor-readable code is further configured to:
transmit an indication of the second puncturing pattern to at least the STAs configured to operate according to the second wireless communication protocol release.

28. The wireless communication device of any one or more of clauses 26-27, where the second puncturing pattern includes a non-punctured 20 MHz subchannel corresponding to a primary channel of the AP.

29. The wireless communication device of any one or more of clauses 26-28, where execution of the processor-readable code is configured to select the second puncturing pattern by:
identifying each of the puncturing patterns of the set of puncturing patterns defined by the second wireless communication protocol release which includes non-punctured subchannels that are subsets of the one or more non-punctured subchannels of the first puncturing pattern; and
selecting the identified puncturing pattern that includes the most non-punctured subchannels as the second puncturing pattern.

30. The wireless communication device of any one or more of clauses 26-29, where the selection of the second puncturing pattern is based on a match between the received bitmap and one or more stored bitmaps corresponding to the set of puncturing patterns defined by the second wireless communication protocol release.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless station (STA), comprising:
   receiving an indication of a first puncturing pattern to be used for transmitting or receiving data over a wireless channel, the first puncturing pattern being defined by a first wireless communication protocol release;
   selecting a second puncturing pattern from a set of puncturing patterns defined by a second wireless communication protocol release, the second puncturing pattern including one or more non-punctured subchannels that are subsets of one or more corresponding non-punctured subchannels of the first puncturing pattern; and
   transmitting or receiving one or more packets over the wireless channel based on the second puncturing pattern.

2. The method of claim 1, wherein the STA is configured to operate according to the second wireless communication protocol release and not configured to operate according to the first wireless communication protocol release.

3. The method of claim 1, wherein the second puncturing pattern includes:
   a frequency bandwidth of 320 MHz and zero or more punctured subchannels having a 40 MHz frequency bandwidth, an 80 MHz frequency bandwidth, or an 80+40 MHz frequency bandwidth;
   a frequency bandwidth of 160 MHz and zero or more punctured subchannels having a 40 MHz frequency bandwidth or a 20 MHz frequency bandwidth;
   a frequency bandwidth of 80 MHz and zero or more punctured subchannels having a 20 MHz frequency bandwidth;
   a frequency bandwidth of 40 MHz without puncturing; or
   a frequency bandwidth of 20 MHz without puncturing.

4. The method of claim 1, wherein the second puncturing pattern includes a non-punctured 20 MHz subchannel corresponding to a primary channel of an access point (AP).

5. The method of claim 1, wherein the indication comprises a bitmap including a plurality of bits, each bit of the bitmap indicating whether a corresponding subchannel of the wireless channel is punctured by the first puncturing pattern.

6. The method of claim 5, wherein the bitmap is received in an extremely high-throughput (EHT) operation element of a beacon frame, an association response frame, a probe response frame, or an action frame.

7. The method of claim 1, wherein selecting the second puncturing pattern includes:
   identifying each of the puncturing patterns of the set of puncturing patterns defined by the second wireless communication protocol release that includes non-punctured subchannels that are subsets of the one or more non-punctured subchannels of the first puncturing pattern; and
   selecting the identified puncturing pattern that includes the most non-punctured subchannels as the second puncturing pattern.

8. The method of claim 7, further comprising:
   in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
   selecting the second puncturing pattern based on the determination.

9. The method of claim 7, further comprising:
   in response to two or more of the identified puncturing patterns including the most non-punctured subchannels, determining which of the two or more identified puncturing patterns is associated with a bitmap having the highest binary index or a bitmap having the lowest binary index; and
   selecting the second puncturing pattern based on the determination.

10. The method of claim 1, wherein selecting the second puncturing pattern is based on a match between the received bitmap and one or more stored bitmaps corresponding to the set of puncturing patterns defined by the second wireless communication protocol release.

11. A method for wireless communication performed by a wireless access point (AP), comprising:
    selecting a first puncturing pattern to be used for transmitting or receiving data over a wireless channel, the first puncturing pattern defined by a first wireless communication protocol release;
    determining a presence of one or more wireless stations (STAs) configured to operate according to a second wireless communication protocol release;
    in response to determining the presence of the one or more STAs configured to operate according to the second wireless communication protocol release, selecting a second puncturing pattern from a set of puncturing patterns defined by the second wireless communication protocol release, the second puncturing pattern including one or more non-punctured subchannels that are subsets of one or more corresponding non-punctured subchannels of the first puncturing pattern; and
    transmitting or receiving one or more packets over the wireless channel based on the second puncturing pattern to or from at least the STAs configured to operate according to the second wireless communication protocol release.

12. The method of claim 11, further comprising:
    transmitting an indication of the second puncturing pattern to at least the STAs configured to operate according to the second wireless communication protocol release.

13. The method of claim 11, wherein the indication comprises a bit carried in an extremely high-throughput (EHT) operation element of a beacon frame, an association response frame, a probe response frame, or an action frame.

14. The method of claim 11, wherein the second puncturing pattern includes:
- a frequency bandwidth of 320 MHz and zero or more punctured subchannels having a 40 MHz frequency bandwidth, having an 80 MHz frequency bandwidth, or an 80+40 MHz frequency bandwidth;
- a frequency bandwidth of 160 MHz and zero or more punctured subchannels having a 40 MHz frequency bandwidth or a 20 MHz frequency bandwidth;
- a frequency bandwidth of 80 MHz and zero or more punctured subchannels having a 20 MHz frequency bandwidth;
- a frequency bandwidth of 40 MHz without puncturing; or
- a frequency bandwidth of 20 MHz without puncturing.

15. The method of claim 11, wherein the second puncturing pattern includes a non-punctured 20 MHz subchannel corresponding to a primary channel of the AP.

16. The method of claim 11, wherein selecting the second puncturing pattern includes:
- identifying each of the puncturing patterns of the set of puncturing patterns defined by the second wireless communication protocol release that includes non-punctured subchannels that are subsets of the one or more non-punctured subchannels of the first puncturing pattern; and
- selecting the identified puncturing pattern that includes the most non-punctured subchannels as the second puncturing pattern.

17. The method of claim 16, further comprising:
- in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
- selecting the second puncturing pattern based on the determination.

18. The method of claim 16, further comprising:
- in response to two or more of the identified puncturing patterns including the most non-punctured subchannels, determining which of the two or more identified puncturing patterns is associated with a bitmap having the highest binary index or a bitmap having the lowest binary index; and
- selecting the second puncturing pattern based on the determination.

19. A wireless communication device comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - receive an indication of a first puncturing pattern to be used for transmitting or receiving data over a wireless channel, the first puncturing pattern being defined by a first wireless communication protocol release;
  - select a second puncturing pattern from a set of puncturing patterns defined by a second wireless communication protocol release, the second puncturing pattern including one or more non-punctured subchannels that are subsets of one or more corresponding non-punctured subchannels of the first puncturing pattern; and
  - transmit or receive one or more packets over the wireless channel based on the second puncturing pattern.

20. The wireless communication device of claim 19, wherein the indication comprises a bitmap including a plurality of bits, each bit of the bitmap indicating whether a corresponding subchannel of the wireless channel is punctured by the first puncturing pattern.

21. The wireless communication device of claim 20, wherein the bitmap is transmitted in an extremely high-throughput (EHT) operation element of a beacon frame, an association response frame, a probe response frame, or an action frame.

22. The wireless communication device of claim 19, wherein execution of the processor-readable code is configured to select the second puncturing pattern by:
- identifying each of the puncturing patterns of the set of puncturing patterns defined by the second wireless communication protocol release that includes non-punctured subchannels that are subsets of the one or more non-punctured subchannels of the first puncturing pattern; and
- selecting the identified puncturing pattern that includes the most non-punctured subchannels as the second puncturing pattern.

23. The wireless communication device of claim 22, wherein execution of the processor-readable code is further configured to:
- in response to two or more of the identified puncturing patterns including the most non-punctured subchannels, determining which of the two or more identified puncturing patterns includes a non-punctured subchannel associated with relatively high frequencies of the wireless channel or with relatively low frequencies of the wireless channel; and
- selecting the second puncturing pattern based on the determination.

24. The wireless communication device of claim 22, wherein execution of the processor-readable code is further configured to:
- in response to two or more of the identified puncturing patterns including the most non-punctured subchannels, determining which of the two or more identified puncturing patterns is associated with a bitmap having the highest binary index or a bitmap having the lowest binary index; and
- selecting the second puncturing pattern based on the determination.

25. The wireless communication device of claim 19, wherein the selection of the second puncturing pattern is based on a match between the received bitmap and one or more stored bitmaps corresponding to the set of puncturing patterns defined by the second wireless communication protocol release.

26. A wireless communication device comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:

select a first puncturing pattern to be used for transmitting or receiving data over a wireless channel, the first puncturing pattern defined by a first wireless communication protocol release;

determine a presence of one or more wireless stations (STAs) configured to operate according to a second wireless communication protocol release;

in response to determining the presence of the one or more STAs configured to operate according to the second wireless communication protocol release, select a second puncturing pattern from a set of puncturing patterns defined by the second wireless communication protocol release, the second puncturing pattern including one or more non-punctured subchannels that are subsets of one or more corresponding non-punctured subchannels of the first puncturing pattern; and transmit or receive one or more packets over the wireless channel based on the second puncturing pattern to or from at least the STAs configured to operate according to the second wireless communication protocol release.

27. The wireless communication device of claim 26, wherein execution of the processor-readable code is further configured to:

transmit an indication of the second puncturing pattern to at least the STAs configured to operate according to the second wireless communication protocol release.

28. The wireless communication device of claim 26, wherein the second puncturing pattern includes a non-punctured 20 MHz subchannel corresponding to a primary channel of the AP.

29. The wireless communication device of claim 26, wherein execution of the processor-readable code is configured to select the second puncturing pattern by:

identifying each of the puncturing patterns of the set of puncturing patterns defined by the second wireless communication protocol release which includes non-punctured subchannels that are subsets of the one or more non-punctured subchannels of the first puncturing pattern; and selecting the identified puncturing pattern that includes the most non-punctured subchannels as the second puncturing pattern.

30. The wireless communication device of claim 26, wherein the selection of the second puncturing pattern is based on a match between the received bitmap and one or more stored bitmaps corresponding to the set of puncturing patterns defined by the second wireless communication protocol release.

\* \* \* \* \*